(12) United States Patent
Mohamed Ghouse et al.

(10) Patent No.: US 12,489,905 B2
(45) Date of Patent: Dec. 2, 2025

(54) DIFFUSION-BASED DATA COMPRESSION

(71) Applicant: QUALCOMM Incorporated, San Diego, CA (US)

(72) Inventors: Noor Fathima Khanum Mohamed Ghouse, Amsterdam (NL); Jens Petersen, Amsterdam (NL); Tianlin Xu, London (GB); Guillaume Konrad Sautiere, Amsterdam (NL); Auke Joris Wiggers, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 164 days.

(21) Appl. No.: 18/458,006

(22) Filed: Aug. 29, 2023

(65) Prior Publication Data
US 2024/0121398 A1    Apr. 11, 2024

Related U.S. Application Data

(60) Provisional application No. 63/410,581, filed on Sep. 27, 2022.

(51) Int. Cl.
*H04N 19/137* (2014.01)
*H04N 19/147* (2014.01)
*H04N 19/162* (2014.01)

(52) U.S. Cl.
CPC ......... *H04N 19/137* (2014.11); *H04N 19/147* (2014.11); *H04N 19/162* (2014.11)

(58) Field of Classification Search
CPC .... G06N 3/044; G06N 3/0455; G06N 3/0464; G06N 3/047; G06N 3/0475; G06N 3/084; G06N 3/088; G06N 3/09; G06N 3/094; G06T 9/002; H04N 19/137; H04N 19/147; H04N 19/162; H04N 19/86
See application file for complete search history.

(56) References Cited

U.S. PATENT DOCUMENTS

2024/0007637 A1* 1/2024 Ma .......................... G06N 3/045
2024/0037802 A1* 2/2024 Solovyev ............. H04N 19/117

OTHER PUBLICATIONS

Yang R., et al., "Lossy Image Compression with Conditional Diffusion Models", arxiv.org, Cornell University Library, 201 Olin Library Cornell University Ithaca, NY 14853, Sep. 14, 2022.*
(Continued)

*Primary Examiner* — Shahan Ur Rahaman
(74) *Attorney, Agent, or Firm* — Polsinelli LLP

(57) ABSTRACT

Systems and techniques are described for processing image data using a residual model that can be configured with an adjustable number of sampling steps. For example, a process can include obtaining a latent representation of an image and processing, using a decoder of a machine learning model, the latent representation of the image to generate an initial reconstructed image. The process can further include processing, using the residual model, the initial reconstructed image and noise data to predict a plurality of predictions of a residual over a number of sampling steps. The residual represents a difference between the image and the initial reconstructed image. The process can include obtaining, from the plurality of predictions of the residual, a final residual representing the difference between the image and the initial reconstructed image. The process can further include combining the initial reconstructed image and the residual to generate a final reconstructed image.

30 Claims, 14 Drawing Sheets

(56) References Cited

OTHER PUBLICATIONS

Ghouse N.F., et al., "A Residual Diffusion Model for High Perceptual Quality Codec Augmentation", arxiv.org, Cornell University Library, 201 Olin Library Cornell University Ithaca, NY 14853, Mar. 29, 2023, pp. 1-23.*

Ghouse N.F., et al., "A Residual Diffusion Model for High Perceptual Quality Codec Augmentation", arxiv.org, Cornell University Library, 201 Olin Library Cornell University Ithaca, NY 14853, Mar. 29, 2023, pp. 1-23, XP091469420, The Whole Document.

Hoogeboom E., et al., "High-Fidelity Image Compression with Score-based Generative Models", arxiv.org, Cornell University Library, 201 Olin Library Cornell University Ithaca, NY 14853, May 26, 2023, 17 Pages, XP091522632, The Whole Document.

International Search Report and Written Opinion—PCT/US2023/073204—ISA/EPO—Nov. 22, 2023.

Rombach R., et al., "High-Resolution Image Synthesis with Latent Diffusion Models", arXiv:2112.10752v1 [cs.CV], arxiv.org, Cornell University Library, 201 Olin Library Cornell University Ithaca, NY 14853, Dec. 20, 2021, pp. 1-45, XP091118987, Section 3.2.

Yang R., et al., "Lossy Image Compression with Conditional Diffusion Models", arxiv.org, Cornell University Library, 201 Olin Library Cornell University Ithaca, NY 14853, Sep. 14, 2022, pp. 1-5, XP093318368, The Whole Document.

* cited by examiner

DIFFUSION-BASED DATA COMPRESSION

CROSS-REFERENCE TO RELATED APPLICATIONS

This application claims the benefit of U.S. Provisional Application No. 63/410,581, filed Sep. 27, 2022, which is hereby incorporated by reference in its entirety and for all purposes.

TECHNICAL FIELD

The present disclosure generally relates to data compression. For example, aspects of the present disclosure include using machine learning systems to compress image and/or video content.

BACKGROUND

Many devices and systems allow data, such as media data (e.g., image data, video data, audio data, etc.), to be processed and output for consumption. Media data, for instance, includes large amounts of data to meet increasing demands in image/video/audio quality, performance, and features. For example, consumers of video data typically desire high quality videos, with high fidelity, resolutions, frame rates, and the like. The large amounts of video data often needed to meet these demands places a significant burden on communication networks and devices that process and store the video data. Video coding techniques may be used to compress video data. One example goal of video coding is to compress video data into a form that uses a lower bit rate, while avoiding or minimizing degradations in video quality. With ever-evolving video services becoming available and the increasing demands in large amounts of video data, coding techniques with better performance and efficiency are needed.

SUMMARY

In some aspects, systems and techniques are described for data compression and/or decompression using one or more machine learning systems. In some cases, machine learning systems (e.g., using one or more neural network systems) are provided that include a residual model (e.g., a diffusion model such as a denoising diffusion probabilistic model), a recurrent neural network (RNN), or other type of machine learning model) for performing data compression using an adjustable number of sampling steps.

According to at least one illustrative example, a method of processing image data is provided. The method includes: obtaining a latent representation of an image; processing, using a decoder of a machine learning model, the latent representation of the image to generate an initial reconstructed image; processing, using a residual model, the initial reconstructed image and noise data to predict a plurality of predictions of a residual over a number of sampling steps, wherein the residual represents a difference between the image and the initial reconstructed image; obtaining, from the plurality of predictions of the residual, a final residual representing the difference between the image and the initial reconstructed image; and combining the initial reconstructed image and the residual to generate a final reconstructed image.

In another example, an apparatus for processing media data is provided that includes at least one memory and at least one processor (e.g., configured in circuitry) communicatively coupled to the at least one memory. The at least one processor is configured to: obtain a latent representation of an image; process, using a decoder of a machine learning model, the latent representation of the image to generate an initial reconstructed image; process, using a residual model, the initial reconstructed image and noise data to predict a plurality of predictions of a residual over a number of sampling steps, wherein the residual represents a difference between the image and the initial reconstructed image; obtain, from the plurality of predictions of the residual, a final residual representing the difference between the image and the initial reconstructed image; and combine the initial reconstructed image and the residual to generate a final reconstructed image.

In another example, a non-transitory computer-readable medium is provided that includes stored thereon at least one instruction that, when executed by one or more processors, may cause the one or more processors to: obtain a latent representation of an image; process, using a decoder of a machine learning model, the latent representation of the image to generate an initial reconstructed image; process, using a residual model, the initial reconstructed image and noise data to predict a plurality of predictions of a residual over a number of sampling steps, wherein the residual represents a difference between the image and the initial reconstructed image; obtain, from the plurality of predictions of the residual, a final residual representing the difference between the image and the initial reconstructed image; and combine the initial reconstructed image and the residual to generate a final reconstructed image.

In another example, an apparatus for processing image data is provided. The apparatus may include: means for obtaining a latent representation of an image; means for processing, using a decoder of a machine learning model, the latent representation of the image to generate an initial reconstructed image; means for processing, using a residual model, the initial reconstructed image and noise data to predict a plurality of predictions of a residual over a number of sampling steps, wherein the residual represents a difference between the image and the initial reconstructed image; means for obtaining, from the plurality of predictions of the residual, a final residual representing the difference between the image and the initial reconstructed image; and means for combining the initial reconstructed image and the residual to generate a final reconstructed image.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
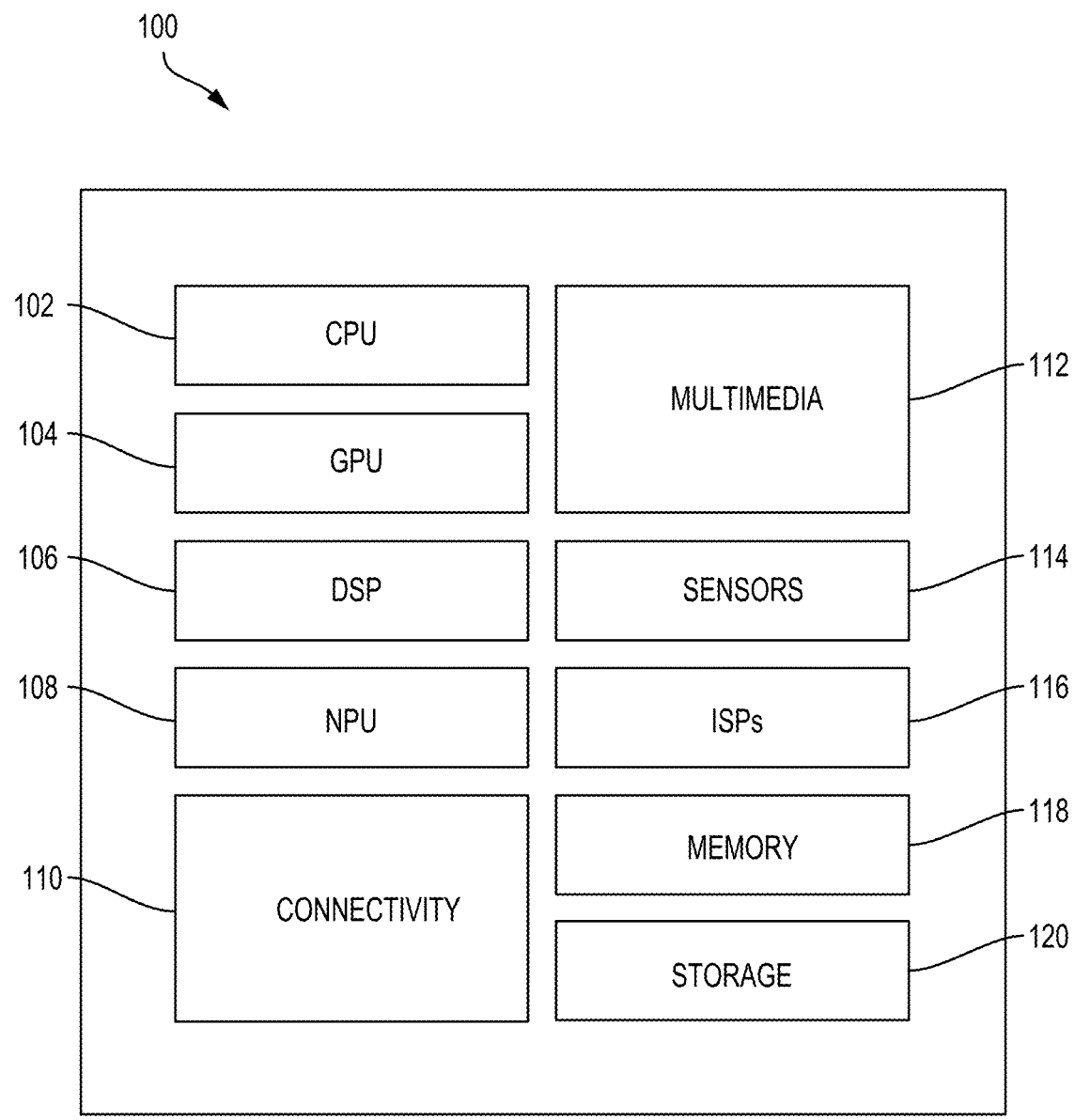
FIG. 1 is a diagram illustrating an example of an image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

As noted above, media data (e.g., image data, video data, and/or audio data) can include large amounts of data, particularly as the demand for high quality video data continues to grow. For example, consumers of image, audio, and video data typically desire increasingly high levels of quality, such as high fidelity, resolution, frame rates, and the like. However, the large amount of data needed to meet such demands can place a significant burden on communication networks, such as high bandwidth and network resource requirements, and on devices that process and store the video data. Compression algorithms (also referred to as coding algorithms or tools) for reducing the amount of data that is needed for storage and/or transmission of image and video data are thus advantageous.

Various techniques can be used to compress media data. For example, compression of image data has been accomplished using algorithms such as Joint Photographic Experts Group (JPEG), Better Portable Graphics (BPG), among others. In some cases, video coding can be performed according to a particular video coding standard. Example video coding standards include high-efficiency video coding (HEVC), essential video coding (EVC), advanced video coding (AVC), moving picture experts group (MPEG) coding, and versatile video coding (VVC). However, such conventional image and video coding techniques can result in artifacts in a reconstructed image after decoding is performed.

In some cases, a machine learning system can be used to compress and/or decompress data. Machine learning (ML) is a subset of artificial intelligence (AI). ML systems include algorithms and statistical models that computer systems can use to perform various tasks by relying on patterns and inference, without the use of explicit instructions. One example of a ML system is a neural network (also referred to as an artificial neural network), which may be composed of an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others. For example, neural network-based compression methods have shown significant promise in compressing image data.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks and training mechanisms exist, such as deep generative neural network models (e.g., generative adversarial network (GANs)), recurrent neural network (RNN) models, variational autoencoders (VAEs), multilayer perceptron (MLP) neural network models, convolutional neural network (CNN) models, autoencoders (AEs), among others. For example, a GAN is a form of generative neural network that can learn patterns in input data so that the neural network model can generate new synthetic outputs that reasonably could have been from the original dataset. A GAN can include two neural networks that operate together, including a generative neural network (or generator) and a discriminative neural network (or discriminator).

RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. CNNs may include collections of artificial neurons that each have a receptive field (e.g., a spatially localized region of an input space) and that collectively tile an input space. CNNs have numerous applications, including pattern recognition and classification.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

An autoencoder (AE) can learn efficient data codings in an unsupervised manner. In some examples, an AE can learn a representation (e.g., data coding) for a set of data by training the network to ignore signal noise. An AE can include an encoder and a decoder. The encoder can map input data into code and the decoder can map the code to a reconstruction of the input data. In some examples, a rate-distortion autoencoder (RD-AE), which is a specific example of a VAE, can be trained to minimize the average rate-distortion loss over a dataset of datapoints such as image and/or video datapoints. In some cases, the RD-AE can do a forward pass at inference time to encode a new datapoint.

A goal of neural-network based compression is to solve the rate-distortion-perception tradeoff, as opposed to solving rate-distortion alone. Distortion (and in turn fidelity, which is the inverse of distortion) indicates a difference between an original image and a reconstructed version of the image output by the AE or other machine learning system. Rate refers to the amount of data needed to represent an original image using a latent code. Perception refers to perceptual quality, which is the quality that a user perceives in an output of a machine learning system (e.g., a reconstructed image, an image upon which super-resolution has been applied, etc.). For instance, a reconstructed image of grass with high perceptual quality but low fidelity (and thus high distortion) may not perfectly match the structure of grass in an original image but would still look very pleasing to the eye.

Generative models (e.g., GANs, VAEs, etc.) can be trained with perceptually driven loss, which can result in high quality details pleasing to the human eye. Such models can drastically improve perceptual quality in the low bitrate regime, at the detriment of distortion. Existing neural data compression methods that optimize the perceptual domain are typically based on GANs.

Another variation of generative approaches to machine learning includes diffusion probabilistic models (DPM), such as denoising diffusion probabilistic models (DDPMs). DPMs and DDPMs can provide good perceptual quality in the application of image synthesis and super-resolution. DPMs have been shown to be superior to GANs in terms of both perceptual quality and sample diversity. However, diffusion models have not been effectively used for the field of data compression, where an improvement in the perceptual quality of reconstructions can lead to a significant practical impact.

It can be difficult to generate high perceptual quality images at any data rate (or bitrate). Generative compression introduced the rate-distortion-perception (R-D-P) tradeoff, but can have problems outputting high perceptual quality images at any rate. Conventional codecs (e.g., JPEG, MPEG, HEVC, VVC, etc.) may output blurry images at low rates, only optimizing distortion. Generative codecs (e.g., HiFiC) output high perceptual quality images at low rate, but may differ too much from original content (and thus have low fidelity), as they are not optimized for distortion (and thus fidelity). At low rates, it can be difficult to navigate how to tradeoff between distortion and perceptual quality.

Systems, apparatuses, processes (also referred to as methods), and computer-readable media (collectively referred to herein as "systems and techniques") are described herein for performing data (e.g., image, video, audio, etc.) compression and decompression (also referred to as encoding and decoding, collectively referred to as coding) using a residual-based machine learning system (or codec) for reconstructing an image (referred to as a reconstructed image) from an input image. The machine learning system can include a codec machine learning model and a residual model configured to predict a plurality of residual predictions over a number of sampling steps based on an initial reconstruction of an image and an original input image (which the initial reconstruction represents). In some cases, the plurality of residual predictions can include a sequence of predictions in a particular sequence. The residual model can include a diffusion model (e.g., a DPM, a DDPM, etc.), an RNN, or other model trained to predict a plurality of residual predictions based on an initial reconstruction of an image and an original image. As described in more detail herein, the number of sampling steps can be tuned or adjusted to meet a desired perceptual quality-fidelity tradeoff (e.g., at a particular bitrate).

The codec machine learning model can include an encoder (e.g., an encoder neural network architecture) and/or a decoder (e.g., a decoder neural network architecture). In some cases, the encoder neural network may be part of the same architecture as the decoder neural network. The encoder can process an input image to generate a latent representation (e.g., latent code) of the input image. In some cases, the encoder can generate the latent representation at least in part by performing quantization and entropy coding (or modeling the quantization and entropy coding using neural network operations). The system can store the latent representation or transmit the latent representation to another system or device.

The decoder can obtain a latent representation of an image (e.g., the latent representation generated by the encoder or another latent representation of an image generated by an encoder of another system and transmitted to the system including the decoder) and can process the latent representation to generate an initial reconstructed image representing the input image. The residual model (e.g., diffusion model, RNN, etc.) of the machine learning system can be trained to predict a residual representing a difference (e.g., a perceptual difference) between the original input image and the initial reconstructed image. The machine learning system can then combine the predicted residual with the initial reconstructed image to generate a final reconstructed image.

In some aspects, the residual model can be conditioned on the initial reconstructed image and can be trained to optimize perceptual quality. For instance, to predict the residual, the residual model can process the initial reconstruction and noise data (e.g., a noise image including random noise) to generate a plurality of predictions of the residual over a number of sampling steps (e.g., as defined by a sampling schedule). The number of sampling steps can be modified or tuned (e.g., by modifying the sampling schedule) in order to increase or decrease the perceptual quality. For instance, residuals between the initial reconstruction and the target image are often sparse and are easier to model. As the number of sampling steps are decreased, the complexity and latency of the residual model becomes less (e.g., resulting in a reduced number of floating-point operations per pixel, floating-point operations per second or FLOPS, or other metric), at the cost of reduced perceptual quality. For example, the residual model can be tuned with a small number of steps (e.g., 100 steps) to achieve a desired perceptual quality and fidelity at low complexity (a relatively small DDPM with a low number of sampling steps). The perceptual quality and fidelity can be determined by the number of steps used to determine the predicted residual at a particular bitrate (e.g., where the bitrate can be set by the encoder of the codec machine learning model).

In some aspects, the system can determine or modify the number of sampling steps based on input, such as user input, input based on system or device constraints, input based on environmental conditions, and/or based on other factors. In some examples, the input can include user input received via a user interface that can be used to configure the machine learning system. In one illustrative example, the user input can indicate a specific number of steps, which corresponds to a specific perceptual quality-fidelity trade-off. In another illustrative example, the user input can indicate a desired perceptual quality, a desired fidelity, or a desired perceptual quality-fidelity trade-off, and based on the input, the system can determine the number of steps needed to satisfy the perceptual quality, fidelity, or perceptual quality-fidelity trade-off.

In some examples, the input can be based on system or device constraints. In one illustrative example, the constraints can include computing constraints of the device implementing the residual-based machine learning system. For instance, a device may have limited compute capability. The residual-based machine learning system may receive input from a processor or other component of the device indicating that the number of sampling steps is to be set to a particular number to reduce computational load. In another illustrative example, the constraints can include power constraints of the device implementing the residual-based machine learning system. The residual-based machine learning system may receive input from the processor or other component of the device indicating that the number of sampling steps is to be set to a particular number to the amount of power used by the residual-based machine learning system.

Modeling residuals thus allows the system to tradeoff fidelity for perceptual quality, or perceptual quality for fidelity, by modifying the sampling schedule (e.g., late start, early stop, or anything in between). For example, the resulting sampling procedure can become an anytime method, where sampling can be stopped at any sampling step for which the desired tradeoff is achieved. In one example, the residual model can be tuned to stop sampling early (e.g., after 120 sampling steps), in which case the final reconstructed image will have high fidelity at the cost of visual quality. In another example, the residual model can be tuned to stop late (e.g., after 250 sampling steps), in which case the final reconstructed image will have high visual quality at the cost of some fidelity. By using a variable rate base codec, the codec can smoothly traverse the rate-distortion-perception tradeoff at test time. The variable sampling schedule of the residual model enables the codec with dynamic computing capabilities, so that performance can be tuned to user or device constraints.

The initial reconstructed image has good fidelity/distortion properties (based on the codec machine learning model being trained according to a rate-distortion tradeoff). By training the residual model to optimize perceptual quality, the number of sampling steps can be adjusted to obtain a residual with a desired perceptual quality. The residual can then be added to the initial reconstructed image to generate the final reconstructed image that has an optimized fidelity/distortion, rate, and perceptual quality trade-off (e.g., an image that looks good perceptually and that closely resembles the original input image that is compressed at a low bitrate).

In some aspects, the residual model can be conditioned on the initial reconstructed image and also on an auxiliary latent code generated by the encoder of the codec machine learning model. The auxiliary latent code provides additional information that can be helpful for the residual model to predict a high-quality residual indicating the perceptual difference between the original image and the initial reconstructed image. The auxiliary latent code is not used by the decoder of the codec machine learning model.

The residual model-based machine learning system can provide a coder-decoder (codec) that performs a lossy compression of images, including high resolution images. The residual model-based machine learning system can achieve competitive or better performance as that of GAN-based methods, and allows smooth traversal of the rate-distortion-perception tradeoff at test time, whereas GAN-based methods cannot flexibly trade off distortion for perceptual quality, as they require re-training with different adversarial factors. For example, the residual model-based machine learning system can dynamically navigate the rate-distortion-perception tradeoff at test time (or inference). Furthermore, while sampling from diffusion probabilistic models is expensive from a computational perspective, the cost of sampling can be drastically reduced by adapting the number of sampling steps (e.g., by modifying the sampling schedule) as described above.

Furthermore, the residual model-based machine learning system solves the challenges of GAN-based generative compression, including difficulty and complexity of training pipeline, and lack of a fidelity (low distortion)-perceptual quality tradeoff parameter. The residual-based codec also provides control of a fidelity (distortion)-perception tradeoff (e.g., based on input, device constraints, etc.), which is not provided by current compression solutions (e.g., GAN-based compression solutions).

The one or more machine learning systems described can be trained and used to perform data compression and/or decompression of data, such as image, video, and/or audio compression and decompression. The machine learning systems described herein can be trained to perform compression/decompression techniques that produce high quality data outputs. The systems and techniques described herein can perform compression and/or decompression of any type of data. For example, in some cases, the systems and techniques described herein can perform compression and/or decompression of image data. As another example, in some cases, the systems and techniques described herein can perform compression and/or decompression of video data. As used herein, the term "image" and "frame" are used interchangeably, referring to a standalone image or frame (e.g., a photograph) or a group or sequence of images or frames (e.g., making up a video or other sequence of images/frames). As another example, in some cases, the systems and techniques described herein can perform compression and/or decompression of audio data. For simplicity, illustration and explanation purposes, the systems and techniques described herein are discussed with reference to compression and/or decompression of image data (e.g., images or frames, videos, etc.). However, as noted above, the concepts described herein can also apply to other modalities such as audio data and any other type of data.

Additional background and aspects related to the systems and techniques will be described with respect to the figures.

FIG. 1 is a diagram illustrating an example of an image processing system 100 in accordance with some examples of the present disclosure. In some cases, the image processing system 100 can include a central processing unit (CPU) 102 or a multi-core CPU configured to perform one or more of the functions described herein. Variables (e.g., neural signals and synaptic weights), system parameters associated with a computational device (e.g., a neural network with weights), delays, frequency bin information, task information, among other information, may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or distributed across multiple blocks. Instructions executed at the CPU 102 may be loaded from a program memory associated with the CPU 102 and/or a memory block 118.

The image processing system 100 may include additional processing blocks tailored to specific functions, such as a GPU 104; a DSP 106; a connectivity block 110 which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect and recognize features. In one implementation, the NPU 108 is implemented in the CPU 102, DSP 106, and/or GPU 104. The image processing system 100 may also include a sensor processor 114, one or more image signal processors (ISPs) 116, and/or a storage 120. In some examples, the image processing system 100 may be based on an ARM instruction set.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, a system-on-chip (SOC), an Internet-of-Things (IoT) device, or any other suitable electronic device(s).

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 13.

The image processing system 100 and/or components thereof can be configured to perform compression and/or decompression (also referred to as encoding and/or decoding, collectively referred to as image coding) using the machine learning systems and techniques described herein. In some cases, the image processing system 100 and/or components thereof can be configured to perform image or video compression and/or decompression using the techniques described herein. In some examples, the machine learning systems can utilize deep learning neural network architectures to perform compression and/or decompression of image, video, and/or audio data. By using deep learning neural network architectures, the machine learning systems can increase the efficiency and speed of the compression and/or decompression of content on a device. For example, a device using the compression and/or decompression techniques described can compress one or more images efficiently using the machine learning based techniques, can transmit the compressed one or more images to a receiving device, and the receiving device can decompress the one or more compressed images efficiently using the machine learning based techniques described herein. As used herein, an image can refer to a still image and/or a video frame associated with a sequence of frames (e.g., a video).

As noted above, a neural network is an example of a machine learning system. A neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
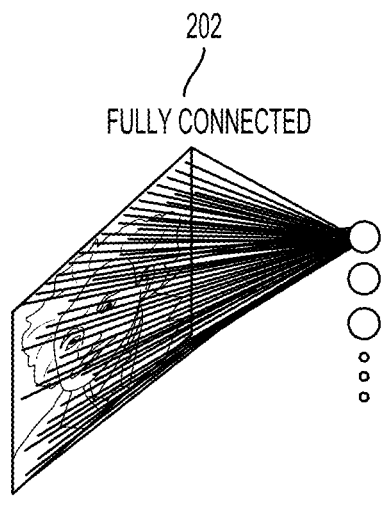
FIG. 2A is a diagram illustrating an example of a fully-connected neural network, in accordance with some examples of the present disclosure.
Figure 2B:
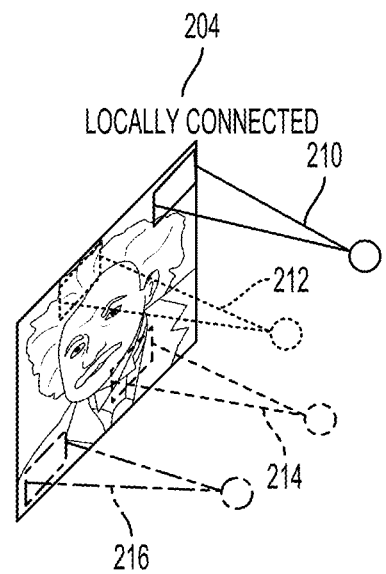
FIG. 2B is a diagram illustrating an example of a locally-connected neural network, in accordance with some examples of the present disclosure.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
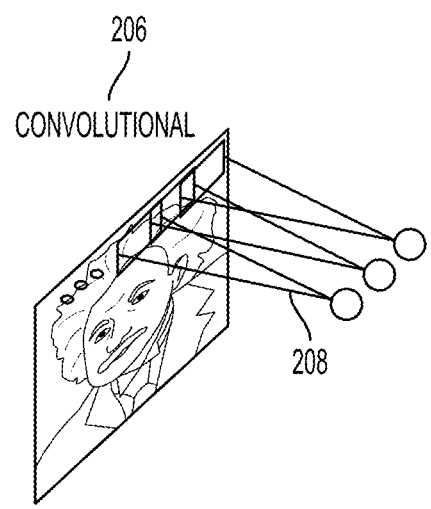
FIG. 2C is a diagram illustrating an example of a convolutional neural network, in accordance with some examples of the present disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
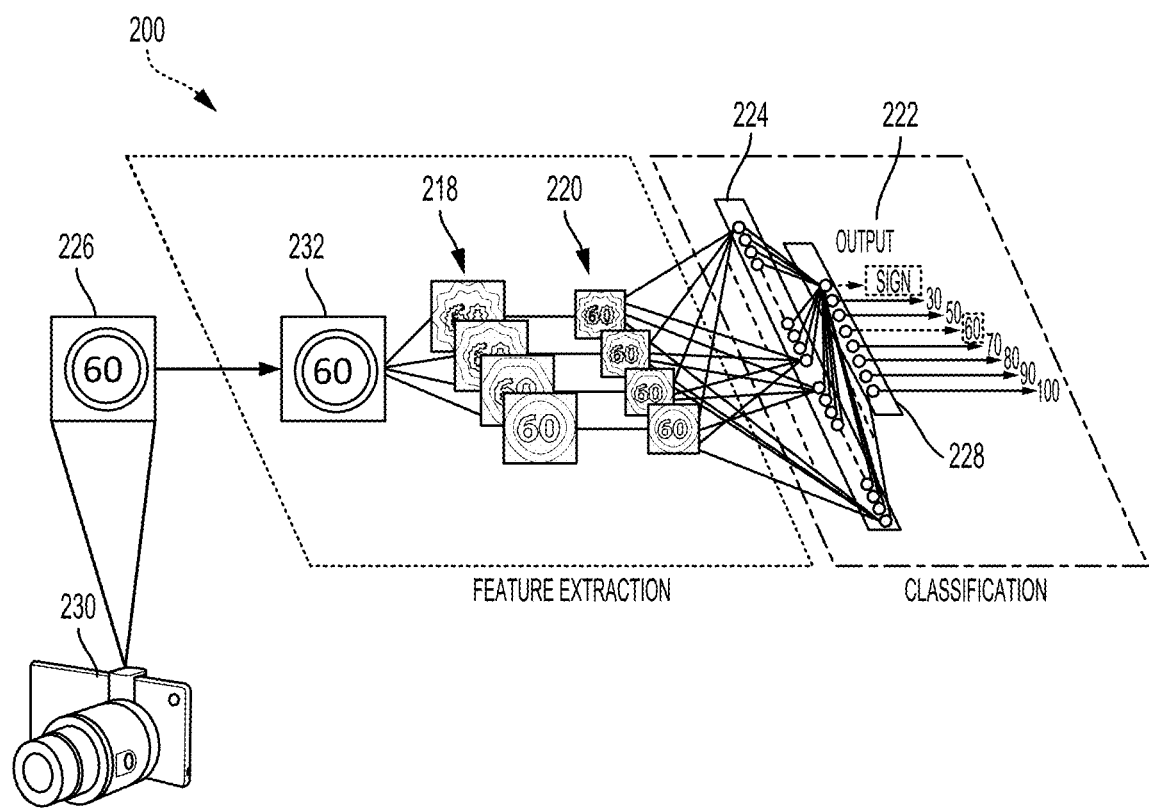
FIG. 2D is a diagram illustrating an example of a deep convolutional network (DCN) for recognizing visual features from an image, in accordance with some examples of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, $\max(0,x)$. Values from adjacent neurons may be further pooled, which corresponds to down sampling, and may provide additional local invariance and dimensionality reduction.

Figure 3:
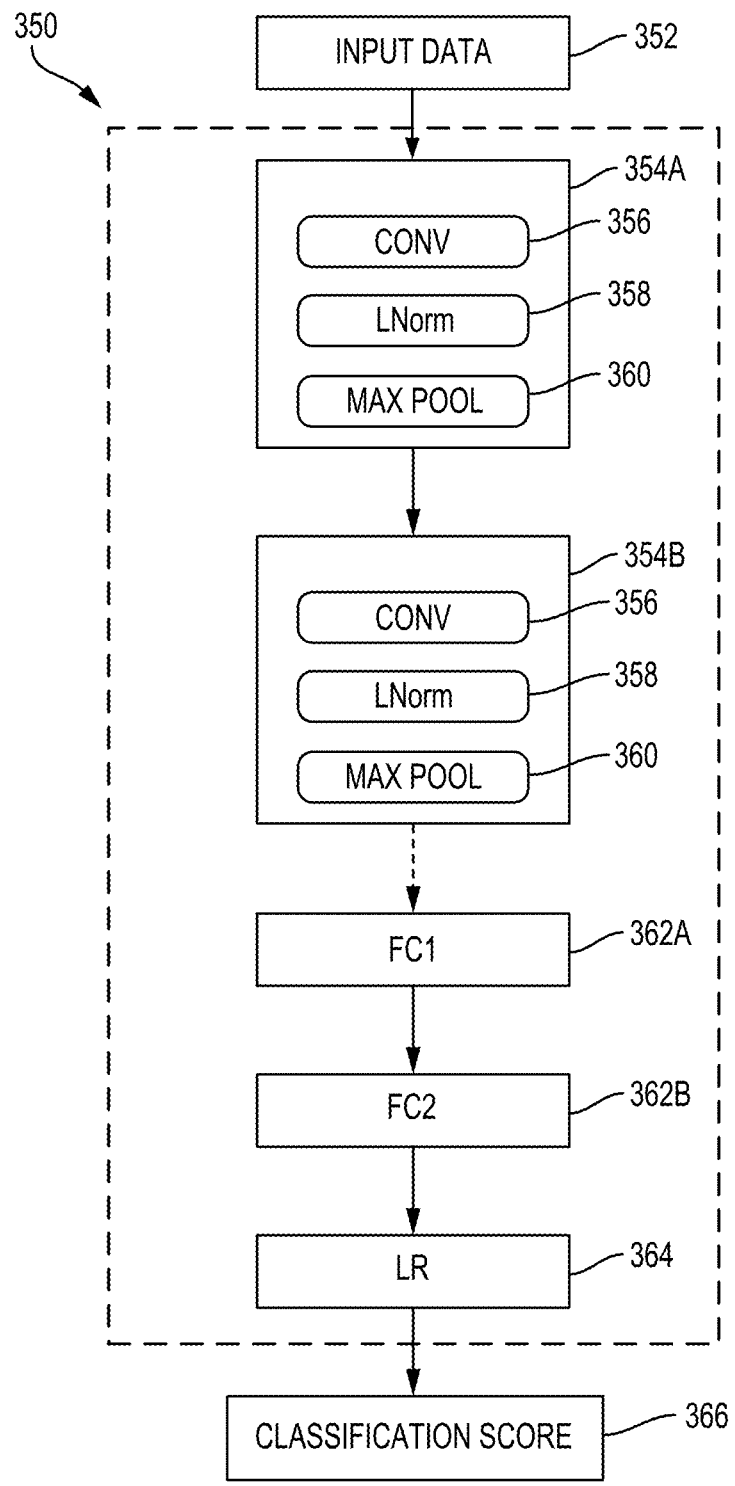
FIG. 3 is a block diagram illustrating an example deep convolutional network (DCN), in accordance with some examples of the present disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In alternative embodiments, the parallel filter banks may be loaded on the DSP 106 or an ISP 116 of an image processing system 100. In addition, the deep convolutional network 350 may access other processing blocks that may be present on the image processing system 100, such as sensor processor 114.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Image, audio, and video content may be stored and/or may be shared among devices. For instance, image, audio, and video content can be uploaded to media hosting services and sharing platforms, and can be transmitted to a variety of devices. Recording uncompressed image, audio, and video content generally results in large file sizes that greatly increase as the resolution of the image audio, and video content increases. For example, uncompressed 16-bit per channel video recorded in 1080p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Because uncompressed image, audio, and video content can result in large files that may involve sizable memory for physical storage and considerable bandwidth for transmission, techniques may be utilized to compress such video content. For instance, to reduce the size of image content—and thus the amount of storage involved to store image content and the amount of bandwidth involved in delivering video content—various compression algorithms may be applied to image, audio, and video content.

In some cases, image content can be compressed using a priori defined compression algorithms, such as Joint Photographic Experts Group (JPEG), Better Portable Graphics (BPG), among others. JPEG, for example, is a lossy form of compression that is based on the discrete cosine transform (DCT). For instance, a device performing JPEG compression of an image can transform the image into an optimal color space (e.g., a YCbCr color space, including luminance (Y), chrominance-blue (Cb), chrominance-red (Cr)), can downsample the chrominance components by averaging groups of pixels together, and can apply a DCT function to blocks of pixels to remove redundant image data and thus compress the image data. The compression is based on identification of similar regions inside of the image and converting the regions to a same color code (based on the DCT function). Video content can also be compressed using a priori defined compression algorithms, such as the Motion Picture Experts Group (MPEG) algorithms, H.264, or the High Efficiency Video Coding algorithm.

These a priori defined compression algorithms may be able to retain the majority of the information in raw image and video content, and may be defined a priori based on signal processing and information theory ideas. However, while these predefined compression algorithms may be applicable generally (e.g., to any type of image/video content), the compression algorithms may not take into account similarities in content, new resolutions or frame rates for video capture and delivery, non-natural imagery (e.g., radar imagery or other imagery captured via various sensors), and the like.

The a priori defined compression algorithms are considered lossy compression algorithms. In lossy compression of an input image (or video frame), the input image cannot be coded and then decoded/reconstructed so that the exact input image is reconstructed. Rather, in lossy compression, an approximate version of the input image is generated after decoding/reconstruction of the compressed input image. Lossy compression results in a reduction in bitrate, at the cost of distortion which results in artifacts being present in the reconstructed image. Therefore, there is a rate-distortion tradeoff in lossy compression systems. For certain compression methods (e.g., JPEG, BPG, among others), the distortion-based artifacts can take the form of blocking or other artifacts. In some cases, neural network based compression can be used and can result in high quality compression of image data and video data. In some cases, blurring and color shift are examples of artifacts.

Whenever the bitrate goes below a true entropy of input data, it may be difficult or impossible to reconstruct the exact input data. However, the fact that there is distortion/loss realized from the compression/decompression of the data does not mean that the reconstructed image or frame does not have to have artifacts. Indeed, it can be possible to reconstruct a compressed image to another similar, but different, image that has high visual quality.

As noted previously, compression and decompression can be performed using one or more machine learning (ML) systems. In some cases, such ML based systems can provide image and/or video compression that produces high quality visual outputs. In some examples, such systems can perform compression and decompression of content (e.g., image content, video content, audio content, etc.) using a deep neural network(s) such as a rate-distortion autoencoder (RD-AE). The deep neural network can include an autoencoder (AE) that maps images into a latent code space (e.g., including a set of codes z). The latent code space can include a code space used by an encoder and a decoder, and in which the content has been encoded into the codes z. The codes (e.g., codes z) can also be referred to as latents, latent variables or latent representations. The deep neural network can include a probabilistic model (also referred to as a prior or code model) that can losslessly compress the codes z from the latent code space. The probabilistic model can generate a probability distribution over the set of codes z that can represent encoded data based on the input data. In some cases, the probability distribution can be denoted as (P(z)).

In some examples, the deep neural network may include an arithmetic coder that generates a bitstream including the compressed data to be output based on the probability distribution P(z) (which may itself be a neural network) and/or the set of codes z. The bitstream including the compressed data can be stored and/or can be transmitted to a receiving device. The receiving device can perform an inverse process to decode or decompress the bitstream using, for example, an arithmetic decoder, a probabilistic (or code) model, and a decoder of an AE. The device that generated the bitstream including the compressed data can also perform a similar decoding/decompression process when retrieving the compressed data from storage.

Figures 4A, 4B, 4C, 4D:
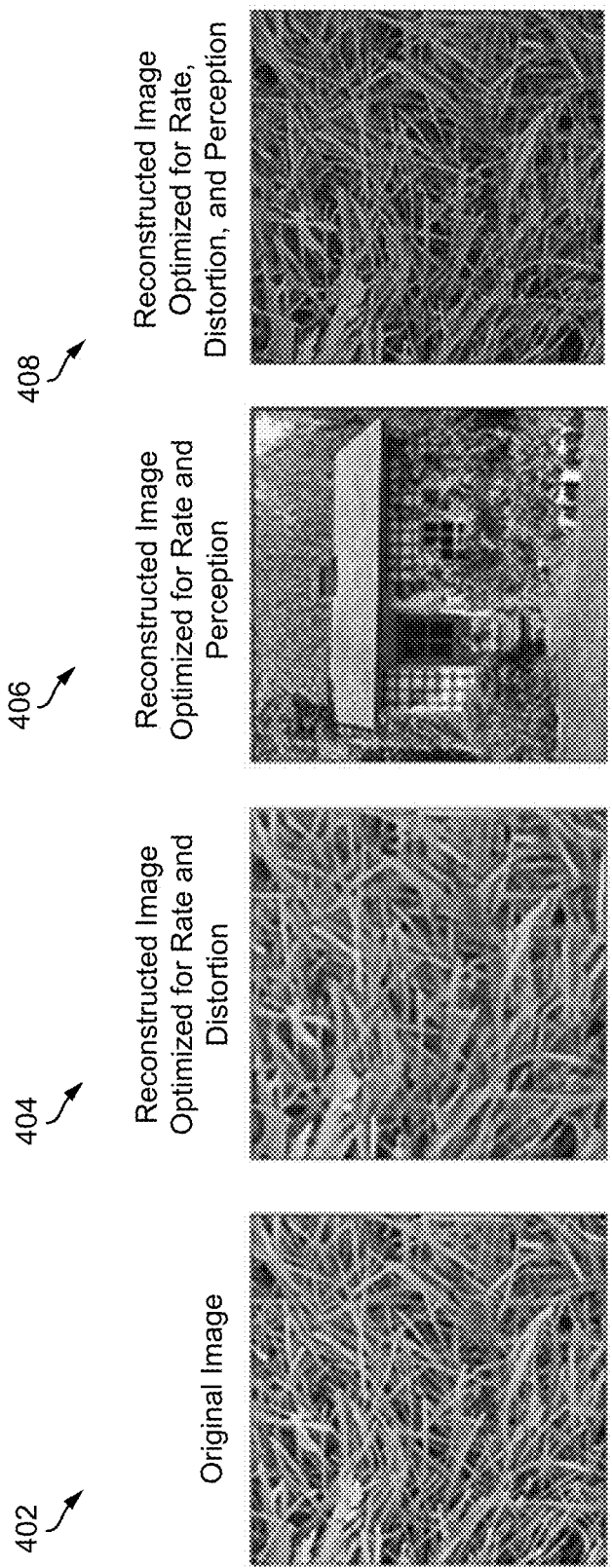
FIG. 4A is a diagram illustrating an original image and FIG. 4B-FIG. 4D are diagrams illustrating examples of reconstructed images using different machine learning systems, in accordance with some examples of the present disclosure.

As noted above, a goal of machine learning-based (e.g., neural network based) data compression is to solve the rate-distortion-perception tradeoff. FIG. 4A is a diagram illustrating an original image 402 and FIG. 4B-FIG. 4D are diagrams illustrating examples of reconstructed images 404, 406, and 408. The reconstructed images 404, 406, and 408 are generated by processing the original image 402 using different machine learning systems optimized for different aspects of rate, distortion, and perception.

For example, the reconstructed image 404 is generated using a machine learning system optimized for rate and distortion. As a result, the reconstructed image 404 has low distortion (and thus high fidelity), but low perceptual quality (e.g., is blurry). The reconstructed image 406 is generated using a machine learning system optimized for rate and perception. Because distortion is not part of the optimization, the reconstructed image 406 is very different from the original image 402, but has high perceptual quality. The reconstructed image 408 is generated using a machine learning system optimized for rate, distortion, and perception, such as the residual-based machine learning system (or codec) described herein (e.g., utilizing a diffusion model, RNN, etc.). As a result, the reconstructed image 408 is similar to the original image 402 in content and has a high perceptual quality, while allowing a latent code representation of the original image 408 to be compressed to a low bitrate.

As described previously, systems and techniques are described herein that provide a residual-based machine learning system (e.g., a machine learning codec) for performing data (e.g., image, video, audio, etc.) compression and decompression. The residual-based machine learning system can include a codec machine learning model for compressing an input image into a latent code and generating an initial reconstructed version of the input image based on the latent code. In some cases, the codec machine learning model can perform rate-distortion neural image (e.g., a still image or a video frame) compression algorithm (e.g., a mean-scale hyperprior), which can provide a good baseline performance in rate-distortion.

The residual-based machine learning system can further include a residual model for generating a residual representing a difference (e.g., a perceptual difference) between the original input image and the initial reconstructed image. As previously described, the residual model can include a diffusion model (e.g., a DPM, DDPM, etc.), a recurrent neural network (RNN), or other type of machine learning model. The residual-based machine learning system can then combine the predicted residual with the initial reconstructed image to generate a final reconstructed image.

The residual model can be trained to improve perceptual quality, which restricts the modeling to the residual. Fewer sampling steps are needed than in traditional unconditional DPM settings, which may be based on the residuals being sparser and more normally distributed than the original input image. In some cases, a fast-sampling scheme can be implemented for the residual models, which can provide further control on the fidelity-perception tradeoff through a number of sampling steps T and additional sampling-time hyperparameters.

As noted above, the residual model can be a diffusion model. The diffusion model can be a DPM or a DDPM in some cases. In general, denoising diffusion probabilistic models are latent variable models in which the T-step latents $x_1, \ldots, x_T$ are defined as Markov chain with non-stochastic processes (e.g., Gaussian transitions). They define a forward process that gradually corrupts the original data $x_0$ by:

$$q(x_{1:T} | x_0) = \prod_{t=1}^{T} q(x_t|x_{t-1}), \quad (1)$$

$$q(x_t|x_{t-1}) = \mathcal{N}(x_t; \sqrt{1-\beta_t} x_{t-1}, \beta_t \mathbb{I}),$$

where $\beta_t$ is the variance for the $t^{th}$ step, which can be defined empirically.

The generative model, parameterized by θ (e.g., a U-net), can then learn to reverse this process, modeling the transition from a tractable distribution to the data distribution:

$$p_\theta(x_{0:T}) = p(x_T) \prod_{t=1}^{T} p_\theta(x_{t-1}|x_t), \quad (2)$$

$$p_\theta(x_{t-1}|x_t) = \mathcal{N}\left(x_{t-1}; \mu_\theta(x_t, t), \sum_\theta (x_t, t)\right),$$

Here, the starting noise distribution can be defined as $p(x_T) := \mathcal{N}(x_T; 0, \mathbb{I})$.

In the context of variational inference, the training can be seen as approximating the posterior of the latent variables $p_\theta(x_{1:T}|x_0)$ by the forward pass $q(x_{1:T}|x_0)$, leading to the evidence lower bound on the log likelihood of $p_\theta(x_0)$. Given that the latents are assumed to be a Markov chain with Gaussian transitions in both the target and variational distributions, parameterizing $$\sum_\theta (x_t, t) = \sigma^2_t \mathbb{I},$$

Ho et al. (2020) showed that the training objective can be reduced to the following form:

$$\mathcal{L} := \mathbb{E}_{x_0, \epsilon, t}[\lambda \cdot \|\epsilon - \epsilon_\theta(\sqrt{\bar{\alpha}_t} x_0 + \sqrt{1-\bar{\alpha}_t} \epsilon, t)\|^2], \quad (3)$$

where:

$$\alpha_t = 1 - \beta_t, \bar{\alpha}_t = \prod_{s=1}^{t} \alpha_s, \lambda = \frac{\beta_t^2}{2\sigma_t^2 \alpha_t(1-\bar{\alpha}_t)}, \quad (4)$$

$$\epsilon \sim \mathcal{N}(0, \mathbb{I}), t \sim \mathcal{U}(1, T). \quad (5)$$

Here, $\epsilon_\theta$ is the typically parameterized as a neural network that learns to predict the noise from $x_t$. Empirically, the sample quality can be improved by optimizing a simplified version of Eq. 3 which sets λ=1.

Neural network-based codecs are systems that learn to compress data from examples. Many existing neural codecs are compression autoencoders, which compress data using an autoencoder-like architecture. A neural encoder $G_e$ can take a datapoint x as input and output a quantized latent variable γ. Given this latent, a neural decoder $G_d$ produces a reconstruction $\hat{x}$. A neural prior or context model $G_p$ can be used to learn the distribution of latent variables p(γ), in order to losslessly compress latents using an entropy coding algorithm to −log p(γ) bits in expectation.

Neural codecs can be trained using a rate-distortion objective including two terms:

$$\mathcal{L}_{RD} = \mathbb{E}_{x \sim p(x)}[\beta \cdot \mathcal{L}_{rate}(\gamma) + \mathcal{L}_{distortion}(x, \hat{x}(\gamma))]. \quad (6)$$

The rate loss corresponds to the number of bits needed to transmit the quantized latent variable z under the neural prior, equal to $\mathcal{L}_{rate} = -\log G_p(\gamma)$. The distortion loss $\mathcal{L}_{distortion}$ is a distance between the reconstruction $\hat{x}$ and the ground truth x, where mean squared error is the common choice. The tradeoff parameter β determines the expected compression ratio: for high β, few bits should be used, and vice versa. As it is impractical to have one codec operate at just one bitrate, the codec can be conditioned on this tradeoff parameter, and β can be varied at training time.

A DDPM can be conditioned on side-information, for example a target class, by providing the input to the generative model. An example of a way to apply a conditional DDPM in the data compression setting is to define an encoder that maps the original input data to a compressed (quantized) representation γ, and to condition the DDPM on this representation directly. The DDPM loss function equation 3 can then be used to model p(x|γ) using the following objective:

$$\mathbb{E}_{x_0, \epsilon, t, \gamma}[\lambda \cdot \|\epsilon - \epsilon_\theta(\sqrt{\bar{\alpha}_t} x_0 + \sqrt{1-\bar{\alpha}_t}\epsilon, t, y)\|^2]. \quad (7)$$

Although p(x|γ) has much lower entropy than p(x), which makes the modeling task easier, a perfectly trained DDPM will sample any datapoint from this distribution. However, in the data compression setting, data compression systems are mostly interested in datapoints with high fidelity.

Figure 5:
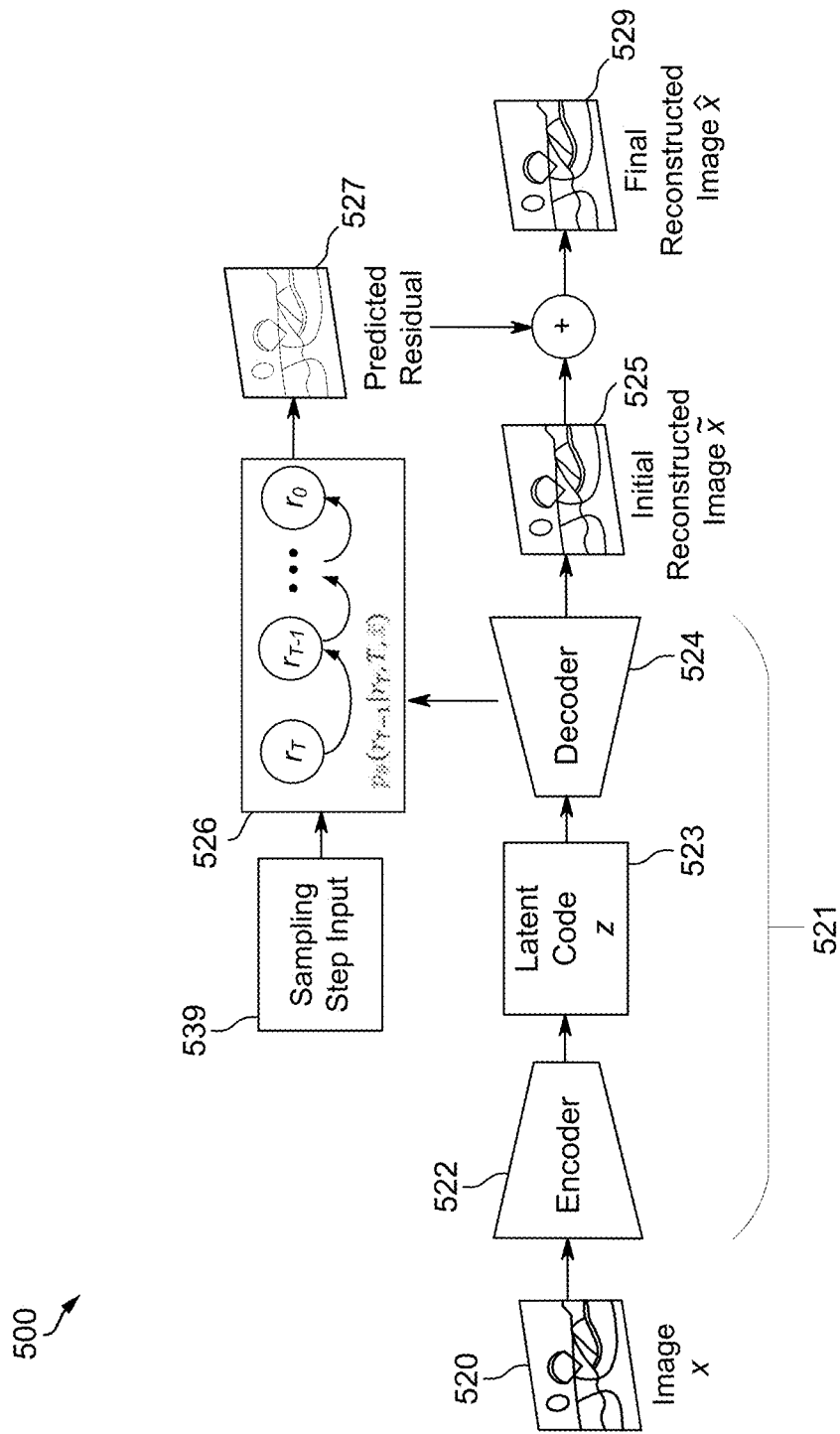
FIG. 5 is a diagram illustrating an example of a machine learning system including a diffusion model for reconstructing an image from an input image, in accordance with some examples of the present disclosure.
Figure 6:
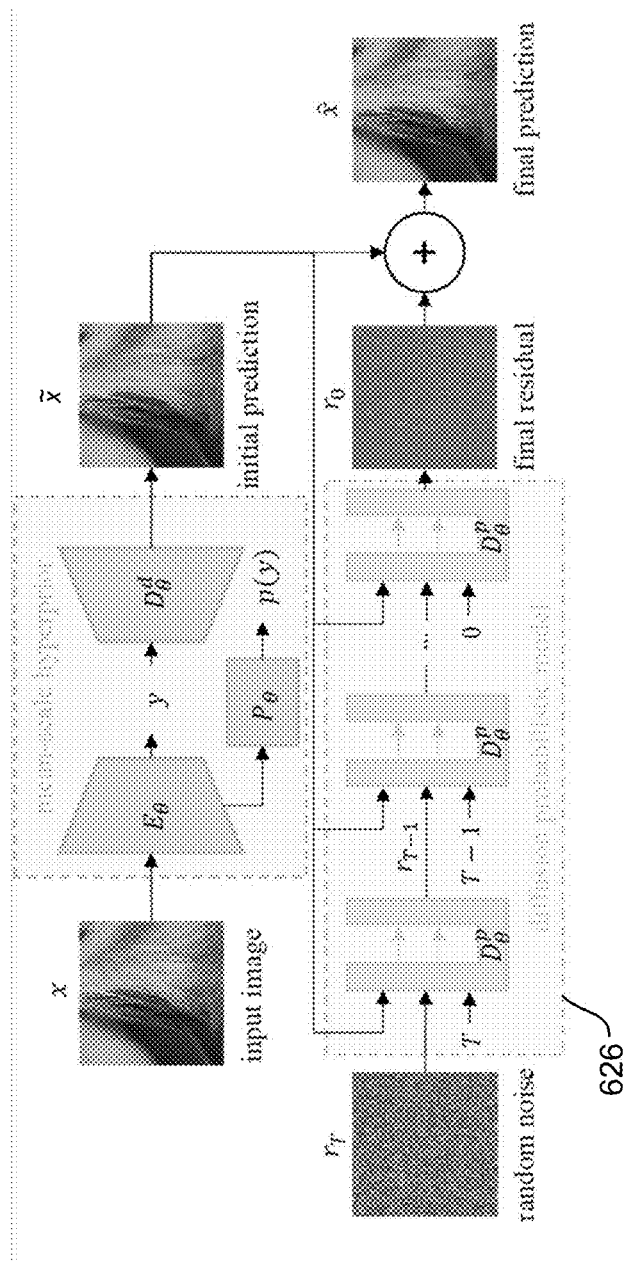
FIG. 6 is a diagram illustrating another example of a machine learning system including a diffusion model for reconstructing an image from an input image, in accordance with some examples of the present disclosure.
Figure 9:
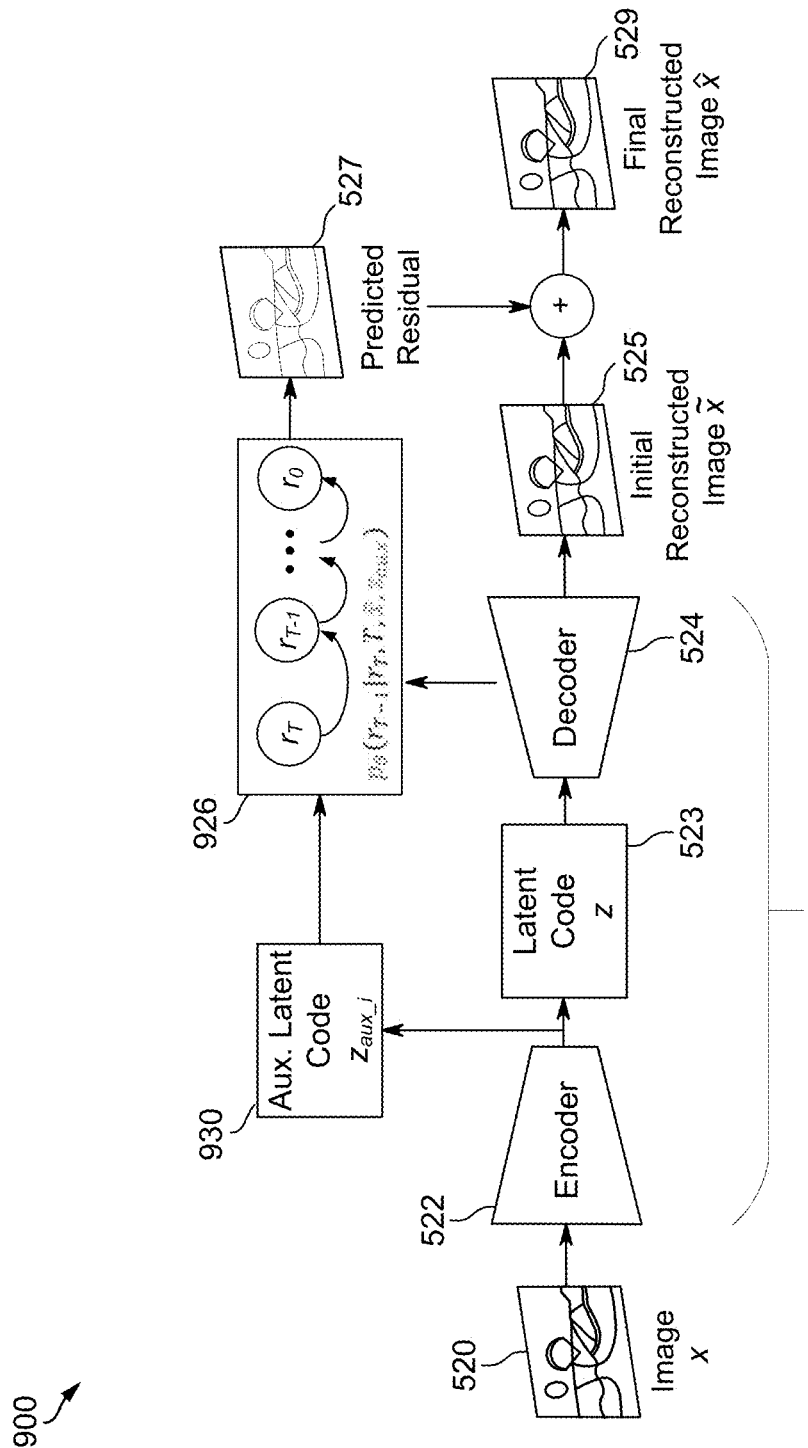
FIG. 9 is a diagram illustrating an example of a machine learning system including a diffusion model conditioned on a reconstructed image and an auxiliary latent code, in accordance with some examples of the present disclosure.

As noted above, to improve perceptual quality, the residual-based machine learning systems and techniques described herein can first produce an initial reconstruction using a decoder $G_d$, and then augment it using a residual model (e.g., a DPM, a DDPM, an RNN, etc.). FIG. 5, FIG. 6, and FIG. 9 are diagrams illustrating examples of residual-based machine learning systems that use diffusion models (e.g., DDPMs) as an illustrative example of a residual model, and are described in more detail below. A decoder of the residual-based machine learning system can include two components, which can be represented as $G_c := \{G_d, G_\epsilon\}$, where $G_d: \mathbb{R}^M \mapsto \mathbb{R}^D$ represents an initial predictor and $G_\epsilon$ learns a residual model (e.g., diffusion model) to predict the residual.

Denoting the initial prediction as $\tilde{x}=G_d(\gamma)$ and the residual $r:=x-\tilde{x}$, the residual model can model the distribution of residuals between the original (or ground truth) image and the initial reconstruction $p(r|\gamma, \tilde{x})$ (an initial reconstructed image $\tilde{x}$). For a perfect encoder/decoder pair, the data processing inequality can indicate that the initial reconstruction $\tilde{x}$ should contain the same information as $\gamma$, conditioning on either latent or initial reconstruction should be equivalent. In practice, if a suboptimal encoder/decoder is used, and there may be practical advantages to choosing either of the two. The systems and techniques described herein can condition the residual model on the initial reconstructed image $\tilde{x}$, as its spatial dimensions are equal to the residual, which can simplify the implementation. In some cases, the residual model can use a U-Net architecture (e.g., as shown in FIG. 6), and the reconstructed image $\tilde{x}$ is concatenated to its input (e.g., noise data or a predicted or latent residual) at each sampling step.

The machine learning system can be trained in two stages to provide a rate-distortion-perceptual quality trade-off. For example, in the first stage, the codec machine learning model (which can be referred to as a base codec) can be optimized using the rate-distortion loss from Eq. 6. A mean squared error or other loss can be used as a distortion loss to ensure that the initial reconstruction $\tilde{x}$ has high fidelity. In the second stage, the residual model can be trained by learning the generative model $r_\theta$:

$$\mathcal{L}_r := \mathbb{E}_{x_0,o,t}[\lambda \cdot \|\epsilon - \epsilon_\theta(\sqrt{\alpha_t}r_0 + \sqrt{1-\alpha_t}\epsilon, t, x_0)\|^2]. \quad (8)$$

Sampling $\hat{r}$ from the residual model can then allows the system to produce the final reconstruction by combining the final residual r with the initial reconstructed image $\tilde{x}$ (denoted as $\hat{x}=\tilde{x}+\hat{r}$).

An example of loss functions that can be used to train the residual model (e.g., the diffusion model 526 described below with respect to FIG. 5) without the auxiliary latent is as follows:

$$L_{total}=L_{distortion}+\beta \cdot L_{rate}+\gamma \cdot L_{diffusion}$$

$$L_{distortion}=\|x_{true}-RDAE(x_{true})\|$$

$$L_{rate}=-\log(z)$$

$$L_{diffusion}=\|r_{true}-\text{diffusion}(r_p, \tilde{x}, t)\|$$

where x represents an image and r represents a residual. In some cases, as noted herein, the codec machine learning model (e.g., the codec machine learning model 521 described below with respect to FIG. 5) can be trained first using $L_{distortion}+\beta L_{rate}$, and then the residual model (e.g., the diffusion model 526 of FIG. 5) can be trained using $L_{diffusion}$ (with the weights of the codec machine learning model frozen during training of the residual model), optimized for perceptual quality. Equation (8) provided above illustrates an example the perceptual quality (P) portion of R-D-P loss (providing the trade-off between rate, distortion, and perceptual quality).

An example of loss functions that can be used to train a residual model with an auxiliary latent (e.g., the diffusion model 526 with the auxiliary latent as described with respect to FIG. 9) is as follows:

$$L_{total}=L_{distortion}+\beta \cdot L_{rate}+\delta \cdot L_{rate,aux}$$

$$L_{rate,aux}=-\log(z_{aux})$$

In some cases, similar to that described above, the codec machine learning model (e.g., codec machine learning model 521) can be trained first using $L_{distortion}+\beta \cdot L_{rate}$, and then the residual model (e.g., the diffusion model 526 of FIG. 5) and an auxiliary encoder (e.g., of the encoder 522 of FIG. 5) can be trained using $L_{diffusion}+\delta \cdot L_{rate,aux}$ (with the weights of the codec machine learning model frozen during training of the residual model).

By separating the two stages, the residual-based machine learning system can produce a high-fidelity initial reconstruction. Depending on the application, the residual-based machine learning system can then determine whether to augment the initial reconstruction, and by how much, using the final residual output by the residual model.

The sampling process for diffusion models (e.g., DDPMs) typically includes many steps (e.g., thousands of steps), and the best performance can be obtained using a high number of sampling steps. Denoising diffusion implicit models (DDIM) provide a training-free sampling scheme that is based on a generalization of the forward process to non-Markovian diffusion processes. This choice of forward process leads to "shorter" generative Markov Chains, which increases sample efficiency. However, using this non-Markovian generative process comes at a cost of quality, especially for high resolution images and at a large number of sampling steps. In the data compression setting, fidelity may be an important factor more so than diversity of samples. Additionally, it can be important to keep computational cost low, which can be obtained by using as few sampling steps as possible. The residual model described herein can use DDIM sampling in some cases.

For a low number of sampling steps, the system may predict $r_0$ directly instead of $\epsilon_0$. One explanation is that prediction errors in $\epsilon_0$-space are amplified in r-space, since $$\hat{r}(z_t) = \frac{1}{\alpha_t}(z_t - \sigma_t \hat{\epsilon}_\theta(z_t)),$$

and $\alpha_t \to 0$. As keeping the number of sampling steps low can be beneficial, as described herein, the residual-based machine learning systems and techniques described herein can use residual model (e.g., a DDPM) that predict r directly.

Using the residual scheme and direct r prediction, the residual model can be configured or tuned to stop sampling at any timestep and use $\tilde{x}+\hat{r}_\theta(z_t, \tilde{x}, t)$ as the final or enhanced reconstruction. For instance, stopping sampling early (near t=T) can result in a predicted residual that is close to zero, leading to a reconstruction with high fidelity. When stopping late (near t=0), high perceptual quality can be obtained at the cost of fidelity. This early-stopping procedure can be conceptually similar to using a different noise schedule at test time, in which case conditioning on the noise, instead of conditioning on timesteps using a fixed schedule, can improve the reconstruction results.

Various illustrative examples are now described using a diffusion model (e.g., a DDPM) as an illustrative example of a residual model, in which case the residual-based machine learning systems and techniques can be referred to as diffusion-based machine learning systems and techniques. While examples are described using a diffusion model as an illustrative example of a residual model, other types of machine learning models or training mechanisms can be used as the residual model, such as an RNN, an RD-AE or other type of VAE, any combination thereof, and/or other types of machine learning models or training mechanisms.

FIG. 5 is a diagram illustrating an example of a diffusion-based machine learning system 500 for reconstructing an image from an input image. The diffusion-based machine learning system 500 includes a base codec machine learning model 521 (or base codec) and a diffusion model 526. FIG. 6 is a diagram illustrating another example of a diffusion-based machine learning system (similar to the system 500) that includes a diffusion model 926 implemented with a U-Net architecture.

In some cases, the codec machine learning model 521 can be implemented as a mean-scale hyperprior. As shown in FIG. 5, the codec machine learning model 521 includes an encoder 522 and a decoder 524. The encoder 522 obtains an input image 520 (shown as input image x) and processes the input image 520 to generate a latent code 523 (shown as latent code z). The latent code 523 provides a latent representation of the input image 520. In some cases, the decoder 524 can obtain the latent code 523 generated by the encoder 522. In some cases, the decoder 524 can obtain another latent representation (e.g., latent code) of an image generated by an encoder of another machine learning system. For instance, the other machine learning system (or a device or system in which the other machine learning system is deployed) can generate a bitstream representing a latent representation of an image, such as by quantizing and/or entropy coding (e.g., using the arithmetic coder 706 of FIG. 7) the output of the encoder of the other machine learning system. The other machine learning system (or device or system) can transmit the bitstream to the machine learning system 500 for processing by the decoder 524. The decoder 524 can process the latent code 523 (or the latent representation or code from the other machine learning system) to generate an initial reconstructed image 525 (shown as initial reconstructed image x̃). In some cases, the machine learning system 500 can perform entropy decoding and/or dequantization to the latent code 523 prior to or as part of generating the initial reconstructed image 525.

Figure 7:
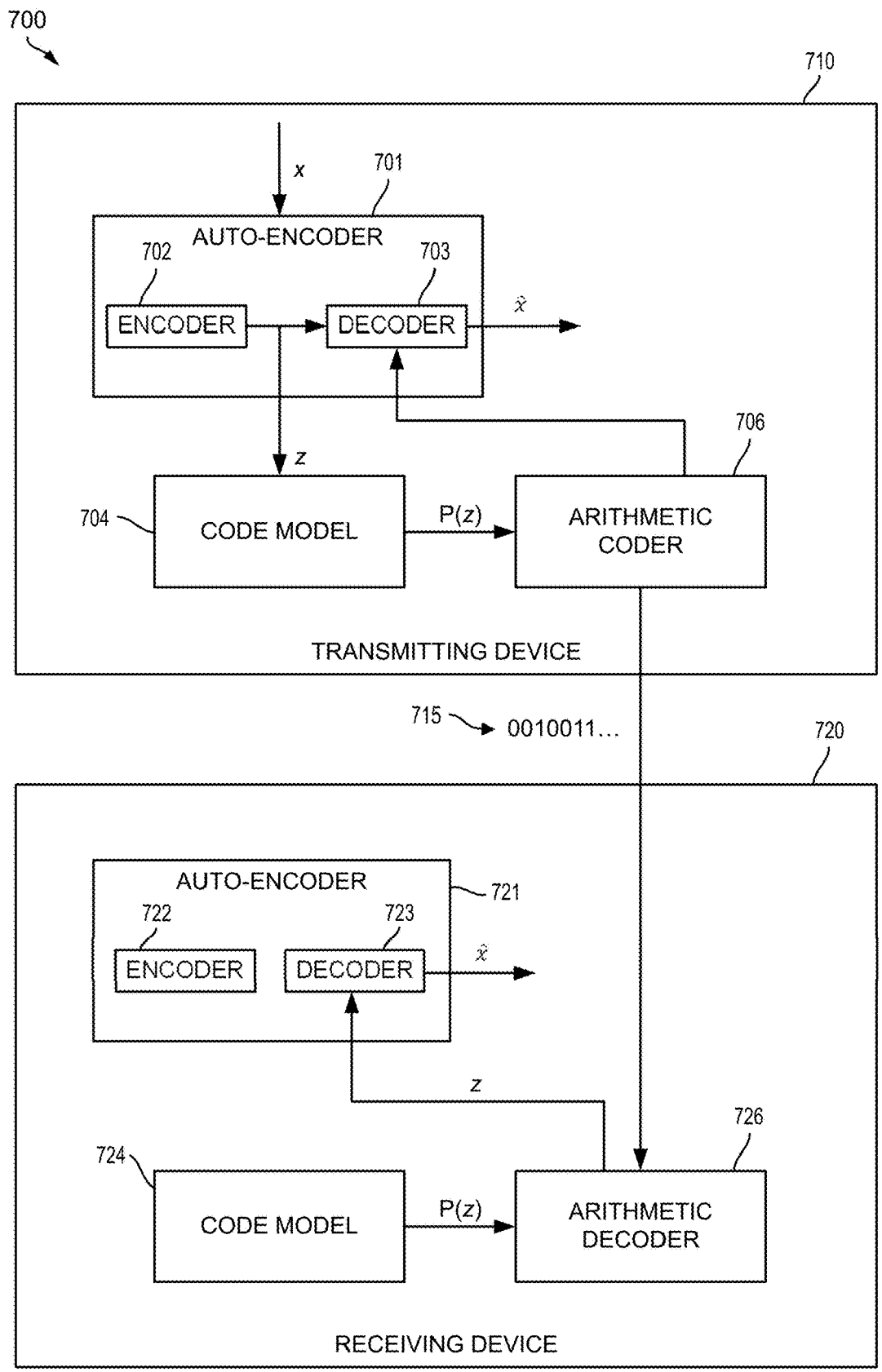
FIG. 7 is a diagram illustrating an example of a system including a transmitting device for compressing video content and a receiving device for decompressing a received bitstream into video content, in accordance with some examples of the present disclosure.
Figure 8:
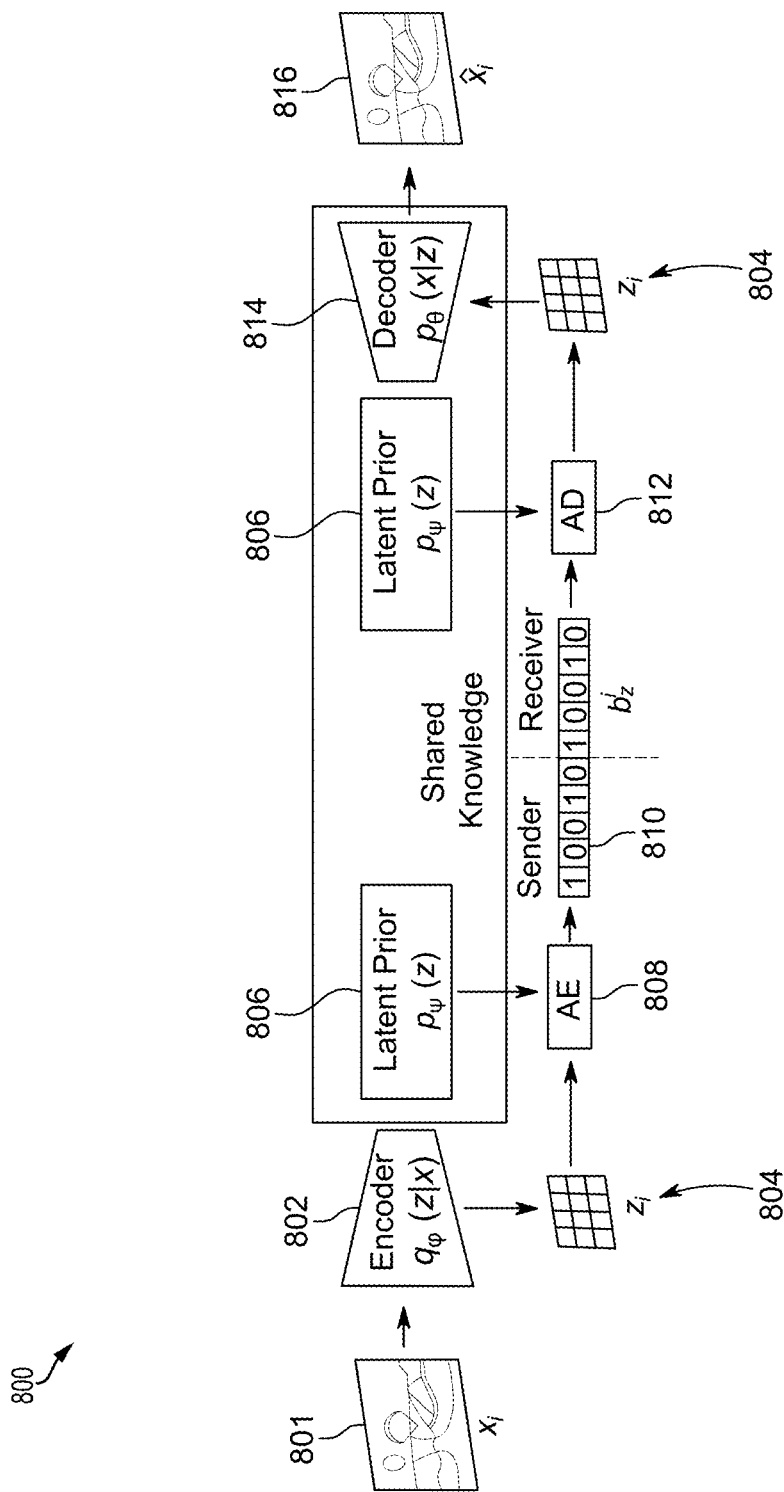
FIG. 8 is a diagram illustrating an example of a rate-distortion autoencoder system, in accordance with some examples of the present disclosure.

FIG. 7 and FIG. 8 are diagrams illustrating examples of systems 700 and 800, respectively, that can be used to implement the codec machine learning model 521. For example, FIG. 7 is a diagram illustrating a system 700 including a transmitting device 710 and a receiving device 720. In some examples, the codec machine learning model 521 can be or can include the transmitting device 710. In some examples, the codec machine learning model 521 can be or can include the receiving device 720.

The transmitting device 710 and the receiving device 720 can each be referred to in some cases as a RD-AE. The transmitting device 710 can compress image content, and can store the compressed image content and/or transmit the compressed image content to a receiving device 720 for decompression. The receiving device 720 can decompress the compressed image content, and can output the decompressed image content on the receiving device 720 (e.g., for display, editing, etc.) and/or can output the decompressed image content to other devices (e.g., a television, a mobile device, or other device) connected to receiving device 720. In some cases, the receiving device 720 can become a transmitting device by compressing (using encoder 722) image content and storing and/or transmitting the compressed image content to another device, such as the transmitting device 710 (in which case the transmitting device 710 would become a receiving device). While the system 700 is described herein with respect to image compression and decompression in some examples, one of skill will appreciate that the system 700 can use the techniques described herein for compressing and decompressing video, audio, and/or other media content.

As illustrated in FIG. 7, the transmitting device 710 includes an image compression pipeline, and the receiving device 720 includes an image bitstream decompression pipeline. The image compression pipeline in the transmitting device 710 and the bitstream decompression pipeline in the receiving device 720 generally use one or more artificial neural networks to compress image content and/or decompress a received bitstream into image content, according to aspects of the present disclosure. The image compression pipeline in the transmitting device 710 includes an autoencoder 701, a code model 707, and an arithmetic coder 706. In some implementations, the arithmetic coder 706 is optional and can be omitted in some cases. The image decompression pipeline in the receiving device 720 includes an autoencoder 721, a code model 724, and an arithmetic decoder 726. In some implementations, the arithmetic decoder 726 is optional and can be omitted in some cases. The autoencoder 701 and the code model 704 of the transmitting device 710 are illustrated in FIG. 7 as a machine learning system that has been previously trained and thus configured for performing operations during inference or operation of the trained machine learning system. The autoencoder 721 and the code model 724 are also illustrated as a machine learning system that has been previously trained.

The autoencoder 701 includes an encoder 702 and a decoder 703. The encoder 702 can perform lossy compression on received uncompressed image content by mapping pixels in one or more images of the uncompressed image content to a latent code space (including codes z). The encoder 702 can be configured such that the latent codes z representing a compressed (or encoded) image are discrete or binary. In some cases, these codes can be generated based on stochastic perturbation techniques, soft vector quantization, or other techniques that can generate distinct codes. In some aspects, autoencoder 701 may map uncompressed images to codes having a compressible (low entropy) distribution. These latent codes may be close in cross-entropy to a predefined or learned prior distribution.

In some examples, the autoencoder 701 can be implemented using a convolutional architecture. For instance, in some cases, autoencoder 701 can be configured as a two-dimensional convolutional neural network (CNN) such that autoencoder 701 learns spatial filters for mapping image content to the latent code space. In examples in which the system 700 is used for coding video data, the autoencoder 701 can be configured as a three-dimensional CNN such that autoencoder 701 learns spatio-temporal filters for mapping video to a latent code space. In such a network, the autoencoder 701 may encode video in terms of a key frame (e.g., an initial frame marking the beginning of a sequence of frames in which subsequent frames in the sequence are described as a difference relative to the initial frame in the sequence), warping (or differences) between the key frame and other frames in the video, and a residual factor. In other aspects, autoencoder 701 may be implemented as a two-dimensional neural network conditioned on previous frames, a residual factor between frames, and conditioning through stacking channels or including recurrent layers.

The encoder 702 of the autoencoder 701 can receive as input a first image (designated in FIG. 7 as image x) and can map the first image x to a code z in a latent code space (and can be referred to as a latent code). As noted above, the encoder 702 can be implemented as a two-dimensional convolutional network such that the latent code space has at each (x, y) position a vector describing a block of the image x centered at that position. The x-coordinate can represent a horizontal pixel location in the block of the image x, and the y-coordinate can represent a vertical pixel location in the block of the image x. When coding video data, the latent code space can have a t variable or position, with the t variable representing a timestamp in a block of video data (in addition to the spatial x- and y-coordinates). By using the two dimensions of the horizontal and vertical pixel positions, the vector can describe an image patch in the image x.

A decoder 703 of the autoencoder 701 can then decompress the code z to obtain a reconstruction x̂ of the first image x. Generally, the reconstruction x̂ can be an approximation of the uncompressed first image x and need not be an exact copy of the first image x. In some cases, the reconstructed image x̂ can be output as a compressed image file for storage in the transmitting device.

The code model 704 receives the code z representing an encoded image or portion thereof and can generate a probability distribution P(z) over a set of compressed codewords that can be used to represent the code z. In some examples, the code model 704 can include a probabilistic auto-regressive generative model. In some cases, the codes for which a probability distribution may be generated include a learned distribution that controls bit assignment based on the arithmetic coder 706. For example, using the arithmetic coder 706, a compression code for a first code z can be predicted in isolation; a compression code for a second code z can be predicted based on the compression code for the first code z; a compression code for a third code z can be predicted based on the compression codes for the first code z and the second code z, and so on. The compression codes generally represent different spatio-temporal chunks of a given image to be compressed.

In some aspects, the latent code z may be represented as a three-dimensional tensor. The three dimensions of the tensor may include a feature channel dimension, and height and width spatial dimensions (e.g., denoted as code $z_{c,w,h}$). Each code $z_{c,w,h}$ (representing a code indexed by channel and horizontal and vertical position) can be predicted based on a previous code, which can be a fixed and theoretically arbitrary ordering of codes. In some examples, the codes can be generated by analyzing a given image file from start to finish and analyzing each block in the image in a raster scan order.

The code model 704 can learn the probability distribution for an input code z using a probabilistic auto-regressive model. The probability distribution can be conditioned on its previous values (as described above). In some examples, the probability distribution can be represented by the following equation:

$$P(z) = \Pi_{c=0}^{C} \Pi_{w=0}^{W} \Pi_{h=0}^{H} p(z_{c,w,h} | z_{0:c,0:w,0:h})$$

where c is a channel index for all image channels C (e.g., the R, G, and B channels, the Y, Cb, and Cr channels, or other channels), w is a width index for a total image frame width W, and h is a height index for a total image frame height H.

In some examples, the probability distribution P(z) can be predicted by a fully convolutional neural network of causal convolutions. In some aspects, the kernels of each layer of the convolutional neural network can be masked such that the convolutional network is aware of previous values $z_{0:c,0:w,0:h}$ and may not be aware of other values in calculating a probability distribution. In some aspects, a final layer of the convolutional network may include a softmax function that determines the probability of a code in latent space being applicable over an input value (e.g., a likelihood that a given code can be used to compress a given input).

The arithmetic coder 706 uses the probability distribution P(z) generated by the code model 704 to generate a bitstream 715 (shown in FIG. 7 as "0010011 . . . ") corresponding to a prediction of the code z. The prediction of the code z can be represented as the code having a highest probability score in a probability distribution P(z) generated over a set of possible codes. In some aspects, the arithmetic coder 706 can output a bitstream of variable length based on the accuracy of a prediction of code z and the actual code z generated by the autoencoder 701. For example, the bitstream 715 can correspond to a short codeword if the prediction is accurate, whereas the bitstream 715 may correspond to longer codewords as a magnitude of a difference between code z and the prediction of code z increases.

In some cases, the bitstream 715 can be output by arithmetic coder 706 for storage in a compressed image file. The bitstream 715 can also be output for transmission to a requesting device (e.g., the receiving device 720, as illustrated in FIG. 7). Generally, the bitstream 715 output by the arithmetic coder 706 may losslessly encode z such that z may be accurately recovered during a decompression processes applied on a compressed image file.

The bitstream 715 generated by the arithmetic coder 706 and transmitted from the transmitting device 710 can be received by the receiving device 720. Transmission between the transmitting device 710 and the receiving device 720 can occur using any of various suitable wired or wireless communication technologies. Communication between the transmitting device 710 and the receiving device 720 may be direct or may be performed through one or more network infrastructure components (e.g., base stations, relay stations, mobile stations, network hubs, routers, and/or other network infrastructure components).

As illustrated, the receiving device 720 can include an arithmetic decoder 726, a code model 724, and an autoencoder 721. The autoencoder 721 includes an encoder 722 and a decoder 723. The decoder 723, for a given input, can produce the same or a similar output as the decoder 703. While the autoencoder 721 is illustrated as including the encoder 722, the encoder 722 need not be used during the decoding process to obtain reconstruction x̂ (e.g., an approximation of an original image x that was compressed at the transmitting device 710) from a code z received from the transmitting device 710. In some examples, the decoder 723 can include a decoder of a codec machine learning model (e.g., the decoder 524 of FIG. 5) and a residual model (e.g., the diffusion model 526 of FIG. 5). In such examples, the reconstruction x̂ can include the final reconstructed image 529 of FIG. 5. Further, in such examples, the receiving device 720 may receive input (e.g., the sampling step input 539 of FIG. 5) defining a number of sampling steps to use for the residual model.

The received bitstream 715 can be input into the arithmetic decoder 726 to obtain one or more codes z from the bitstream. The arithmetic decoder 726 may extract a decompressed code z based on a probability distribution P(z) generated by the code model 724 over a set of possible codes and information associating each generated code z with a bitstream. Given a received portion of the bitstream and a probabilistic prediction of the next code z, the arithmetic decoder 726 can produce a new code z as it was encoded by arithmetic coder 706 at transmitting device 710. Using the new code z, the arithmetic decoder 726 can make a probabilistic prediction for a successive code z, read an additional part of the bitstream, and decode the successive code z until the entire received bitstream is decoded. The decompressed code z may be provided to the decoder 723 in the autoencoder 721. The decoder 723 decompresses the code z and outputs an approximation $\hat{x}$ (which can be referred to as a reconstructed or decoded image) of the image content x. In some cases, the approximation $\hat{x}$ of the content x can be stored for later retrieval. In some cases, the approximation $\hat{x}$ of the content x may be recovered by the receiving device 720 and displayed on a screen communicatively coupled to or integral with the receiving device 720.

As noted above, the autoencoder 701 and the code model 704 of the transmitting device 710 are illustrated in FIG. 7 as a machine learning system that has been previously trained. In some aspects, autoencoder 701 and the code model 704 can be trained together using image data. For instance, the encoder 702 of the autoencoder 701 can receive as input a first training image n and can map the first training image n to a code z in the latent code space. The code model 704 can learn a probability distribution P(z) for the code z using the probabilistic auto-regressive model (similar to the techniques described above). The arithmetic coder 706 can use the probability distribution P(z) generated by the code model 704 to generate an image bitstream. Using the bitstream and the probability distribution P(z) from the code model 704, the arithmetic coder 706 can generate the code z, and can output the code z to the decoder 703 of the autoencoder 701. The decoder 703 can then decompress the code z to obtain a reconstruction $\hat{n}$ of the first training image n (where the reconstruction $\hat{n}$ is an approximation of the uncompressed first training image n).

In some cases, a backpropagation engine used during training of the transmitting device 710 can perform a backpropagation process to tune parameters (e.g., weights, biases, etc.) of the neural network of the autoencoder 701 and the code model 704 based on one or more loss functions. In some cases, the backpropagation process can be based on stochastic gradient descent techniques. Backpropagation can include a forward pass, one or more loss functions, a backward pass, and a weight (and/or other parameter(s)) update. The forward pass, loss function, backward pass, and parameter update can be performed for one training iteration. The process can be repeated for a certain number of iterations for each set of training data until the weights and/or other parameters of the neural network are accurately tuned.

For example, the autoencoder 701 can compare n and $\hat{n}$ to determine a loss (e.g., represented by a distance vector or other difference value) between the first training image n and the reconstructed first training image ft. The loss function can be used to analyze error in the output. In some examples, the loss can be based on a maximum likelihood. In one illustrative example using an uncompressed image n as input and reconstructed image $\hat{n}$ as the output, the loss function Loss=D+beta*R can be used to train the neural network system of the autoencoder 701 and code model 704, where R is rate, D is distortion, * denotes a multiplication function, and beta is a tradeoff parameter that is set to a value that defines the bitrate. In another example, the loss function can be represented as that shown in Equation (6) above, reproduced below:

$$\mathcal{L}_{RD}=\mathbb{E}_{x\sim p(x)}[\beta\cdot\mathcal{L}_{rate}(\gamma)+\mathcal{L}_{distortion}(x,\hat{x}(\gamma))]$$

In yet another example, the loss function can be represented as Loss0=$\Sigma_i$distortion(n, $\hat{n}$). Any of the above loss functions can be used to train the neural network system of the autoencoder 701 and code model 704. Other loss functions can be used in some cases, such as when other training data is used. One example of another loss function includes a mean squared error (MSE), defined as $E_{total}=\Sigma\frac{1}{2}$(target−output)$^2$. The MSE calculates the sum of one-half times the actual answer minus the predicted (output) answer squared.

Based on the determined loss (e.g., the distance vector or other difference value) and using the backpropagation process, the parameters (e.g., weights, biases, etc.) of the neural network system of the autoencoder 701 and the code model 704 can be adjusted (effectively adjusting mappings between received image content and the latent code space) to reduce the loss between input uncompressed images and compressed image content generated as output by the autoencoder 701.

The loss (or error) may be high for the first training images, since the actual output values (a reconstructed image) may be much different than the input image. A goal of training is to minimize the amount of loss for the predicted output. The neural network can perform a backward pass by determining which nodes of the neural network (with corresponding weights) most contributed to the loss of the neural network, and can adjust the weights (and/or other parameters) so the loss decreases and is eventually minimized. A derivative of the loss with respect to the weights (denoted as dL/dW, where W are the weights at a particular layer) can be computed to determine the weights that most contributed to the loss of the neural network. For example, the weights can be updated so they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network system of the autoencoder 701 and the code model 704 can continue to be trained in such a manner until a desired output is achieved. For example, the autoencoder 701 and code model 704 can repeat the backpropagation process to minimize or otherwise reduce differences between an input image n and a reconstructed image $\hat{n}$ resulting from decompression of a generated code z.

The autoencoder 721 and the code model 724 can be trained using similar techniques as that described above for training the autoencoder 701 and the code model 704 of the transmitting device 710. In some cases, the autoencoder 721 and the code model 724 can be trained using a same or a different training dataset used to train the autoencoder 701 and the code model 704 of the transmitting device 710.

In the example shown in FIG. 7, the rate-distortion autoencoders (the transmitting device 710 and the receiving device 720) are trained and run at inference according to a bitrate. In some implementations, a rate-distortion autoencoder can be trained at multiple bitrates to allow for generation and output of high quality reconstructed images or video frames (e.g., without or with limited artifacts due to distortion with respect to the input image) when varying amounts of information are provided in the latent codes z.

In some implementations, a set of continuous latents (e.g., which can convey a large amount of information) and corresponding quantized discrete latents (e.g., which contain less information) can be used. After training the RD-AE model, an auxiliary dequantization model can be trained. In some cases, when using the RD-AE, only the discrete latents are transmitted, and the auxiliary dequantization model is used on the decoder side to infer the continuous latents from the discrete latents.

While the system 700 is shown to include certain components, one of ordinary skill will appreciate that the system 700 can include more or fewer components than those shown in FIG. 7. For example, the transmitting device 710 and/or the receiving device 720 of the system 700 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 7. The components shown in FIG. 7, and/or other components of the system 700, can be implemented using one or more compute or processing components. The one or more compute components can include a central processing unit (CPU), a graphics processing unit (GPU), a digital signal processor (DSP), and/or an image signal processor (ISP). An illustrative example of a computing device and hardware components that can be implemented with the system 1600 is described below with respect to FIG. 13.

The system 700 can be part of, or implemented by, a single computing device or multiple computing devices. In some examples, the transmitting device 710 can be part of a first device and the receiving device 720 can be part of a second computing device. In some examples, the transmitting device 710 and/or the receiving device 720 can be included as part of an electronic device (or devices) such as a telephone system (e.g., a smartphone, a cellular telephone, a conferencing system, etc.), a desktop computer, a laptop or notebook computer, a tablet computer, a set-top box, a smart television, a display device, a gaming console, a video streaming device, a SOC, an IoT (Internet-of-Things) device, a smart wearable device (e.g., a head-mounted display (HMD), smart glasses, etc.), a camera system (e.g., a digital camera, an IP camera, a video camera, a security camera, etc.), or any other suitable electronic device(s). In some cases, the system 700 can be implemented by the image processing system 100 shown in FIG. 1. In other cases, the system 700 can be implemented by one or more other systems or devices.

FIG. 8 is a diagram illustrating another example neural network compression system 800 that can be used to implement the codec machine learning model 521 of FIG. 5. In some examples, the neural network compression system 800 can include an RD-AE system. In FIG. 8, the neural network compression system 800 includes an encoder 802, an arithmetic encoder 808, an arithmetic decoder 812, and a decoder 814. In some cases, the encoder 802 and/or decoder 814 can be the same as encoder 402 and/or decoder 403, respectively. In other cases, the encoder 802 and/or decoder 814 can be different than encoder 702 and/or decoder 703, respectively.

The encoder 802 can receive an image 801 (image x) as input and can map and/or convert the image 801 (image x) to a latent code 804 (latent z) in a latent code space. The image 801 can represent a still image and/or a video frame associated with a sequence of frames (e.g., a video). In some cases, the encoder 802 can perform a forward pass to generate the latent code 804. In some examples, the encoder 802 can implement a learnable function. In some cases, the encoder 802 can implement a learnable function parameterized by $\varphi$. For example, the encoder 802 can implement function $q_\varphi(z|x)$. In some examples, the learnable function does not need to be shared with, or known by, the decoder 814.

The arithmetic encoder 808 can generate a bitstream 810 based on the latent code 804 (latent z) and a latent prior 806. In some examples, the latent prior 806 can implement a learnable function. In some cases, the latent prior 806 can implement a learnable function parameterized by $\psi$. For example, the latent prior 806 can implement function $p_\psi(z)$. The latent prior 806 can be used to convert latent code 804 (latent z) into bitstream 810 using lossless compression. The latent prior 806 can be shared and/or made available at both the sender side (e.g., the encoder 802 and/or the arithmetic encoder 808) and the receiver side (e.g., the arithmetic decoder 812 and/or the decoder 814).

The arithmetic decoder 812 can receive encoded bitstream 810 from the arithmetic encoder 808 and use the latent prior 806 to decode latent code 804 (latent z) in the encoded bitstream 810. The decoder 814 can decode latent code 804 (latent z) into approximate reconstruction image 816 (reconstruction $\hat{x}$). In some cases, the decoder 814 can implement a learnable function parameterized by $\theta$. For example, the decoder 814 can implement function $p_\theta(x|z)$. The learnable function implemented by the decoder 814 can be shared and/or made available at both the sender side (e.g., the encoder 802 and/or the arithmetic encoder 808) and the receiver side (e.g., the arithmetic decoder 812 and/or the decoder 814).

The neural network compression system 800 can be trained to minimize the rate-distortion. In some examples, the rate reflects the length of the bitstream 810 (bitstream b), and the distortion reflects the distortion between the image 801 (image x) and the reconstruction image 816 (reconstruction $\hat{x}$). A parameter $\beta$ can be used to train a model for a specific rate-distortion ratio. In some examples, the parameter $\beta$ can be used to define and/or implement a certain tradeoff between rate and distortion. In some examples, a loss according to equation (6) above, or any other suitable loss function, can be used to train the neural network compression system 800.

Returning to FIG. 5, and as noted above, the encoder 522 of the codec machine learning model 521 takes as input the image 520 (image x) and compresses it into the latent code 523 (latent z), and the decoder 524 of the codec machine learning model 521 decodes the latent code 523 to an initial reconstructed image 525 (prediction x). The initial reconstructed image 525 (the initial prediction) can be used to condition the diffusion-based model 526, which can be represented as $p_\theta(r_{T-1}|r_T, T, \hat{x}$ (where $\theta$ denotes its parameters) as shown in FIG. 5.

The diffusion model 526 can receive the initial reconstructed image 525 from the decoder 524 of the codec machine learning model 521. As noted above, the diffusion model 526 is conditioned on the initial reconstructed image 525. For instance, the diffusion model 526 can be trained to predict a residual 527 (referred to as a predicted residual 527) representing a difference (e.g., a perceptual difference) between the original image 520 and initial reconstructed image 525. In some aspects, the diffusion model can be conditioned on the initial reconstructed image and also on an auxiliary latent code generated by the encoder of the codec machine learning model. FIG. 9 is a diagram illustrating an example of a machine learning system including a diffusion model 926 conditioned on the initially reconstructed image 525 and an auxiliary latent code 930 generated by the encoder 522 of the codec machine learning system 521. The auxiliary latent code 930 provides additional information that can be helpful for the diffusion model to predict a high-quality residual indicating the perceptual difference between the original image 520 and the initial reconstructed image 525. For example, the auxiliary latent code 930 provides the diffusion model 526 with access to additional information about the input image 520 than what is contained in the initial reconstructed image 525. The auxiliary latent code 930 may only be used by the diffusion model 526 (it is not used by the decoder 524 of the codec machine learning model 521). In the example of FIG. 9, the initial reconstructed image 525 and the auxiliary latent code 930 can be used to condition the diffusion-based model 926, which can be represented as $p_\theta(r_{T-1})|r_T, t, \hat{x}, z_{aux}$ as shown in FIG. 9.

To predict the residual, the diffusion model 526 can process the initial reconstructed image 525 and noise data to generate a plurality of predictions of the residual over a number of sampling steps (e.g., as defined by a sampling schedule), shown in FIG. 5 as $r_T$, $r_{T-1}$, through a final step $r_0$, where a final predicted residual 527 is determined at the final step $r_0$. The noise data can in some cases include a noise image including random noise. In some cases, the sampling may be performed according to a DDIM sampling strategy. Through iterative sampling, with a relatively low number of sampling steps T (e.g., 100-500 steps), the diffusion model 526 generates a residual $r_0$ which can be added to the initial reconstructed image 525 to generate a final reconstructed image 529 (shown as final reconstructed image $\hat{x}$). For example, as shown, the machine learning system 500 can combine (shown as an add operation) the final predicted residual 527 with the initial reconstructed image 525 to generate the final reconstructed image 529.

Figure 10:
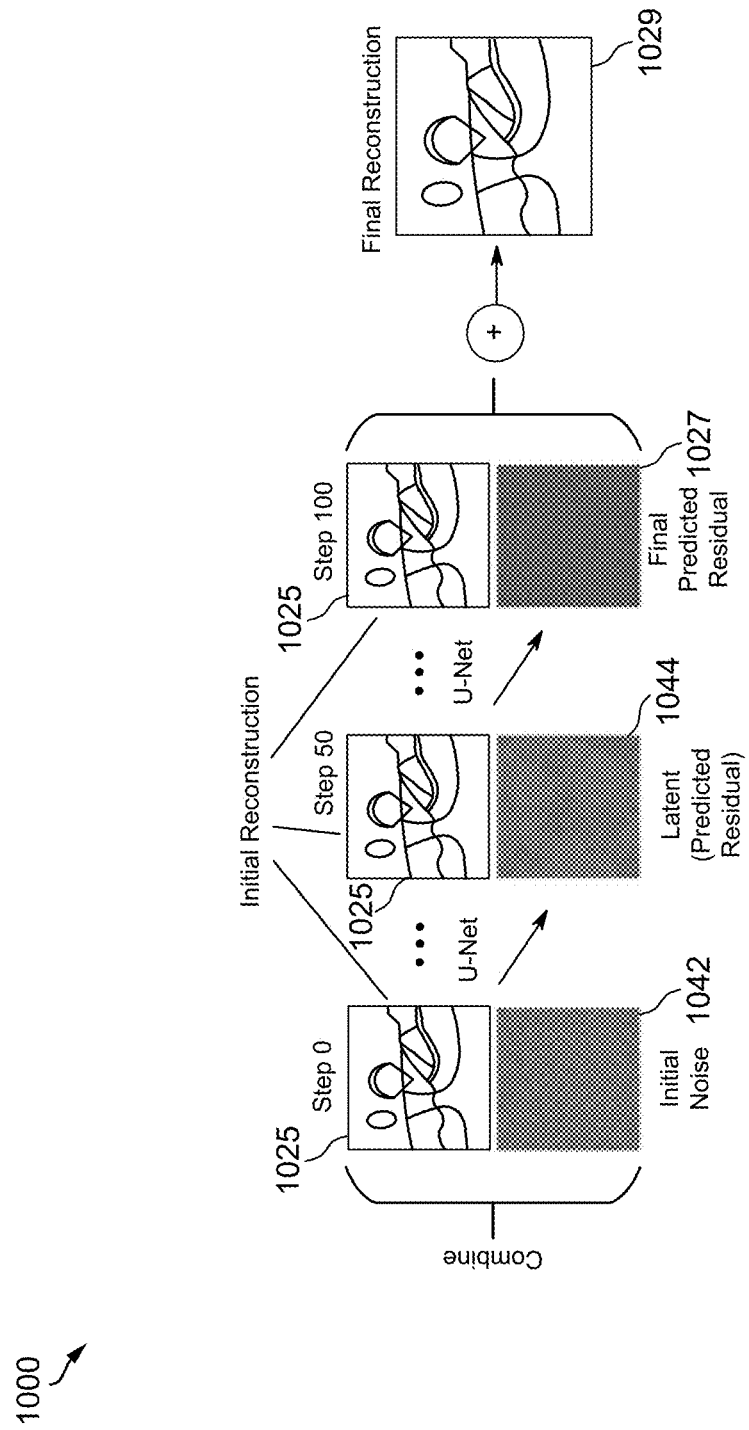
FIG. 10 is a diagram illustrating an example operation of a diffusion model for predicting a residual representing a difference between an input image and a reconstructed image, in accordance with some examples of the present disclosure.

FIG. 10 is a diagram 1000 illustrating an example operation of the diffusion model 526 for predicting a residual representing a difference between an input image (e.g., input image 520) and an initial reconstructed image 1025 (e.g., similar to initial reconstructed image 525). At a first sampling step (shown as Step 0 of the diffusion model 526, the initial reconstructed image 1025 is combined (e.g., concatenated) with initial noise data 1042. The initial noise data 1042 can include an image of random noise. At the first sampling step (Step 0), the diffusion model 526 can process the combined reconstructed image 1025 and initial noise data 1042 to predict a residual (e.g., a latent representation of the predicted residual).

At subsequent sampling steps, the diffusion model 526 can combine (e.g., concatenate) the initial reconstructed image 525 with the predicted residual predicted at the prior sampling step, and process the newly combined data to predict another residual. For example, as shown in FIG. 10, at a subsequent sampling step (shown as Step 50), the diffusion model 526 can obtain a latent 1044, which is a latent representation of a predicted residual predicted at sampling Step 49 of the diffusion model 526. At a final sampling step (shown as Step 100), the diffusion model can generate a final predicted residual 1027. Similar to that described above with respect to FIG. 5, the final predicted residual 1027 can be combined with the initial reconstructed image 1025 to generate a final reconstructed image 1029.

In some aspects, the number of sampling steps of the diffusion model 526 can be modified in order to increase or decrease the perceptual quality of the final reconstructed image 529. As the number of sampling steps are decreased, the complexity and latency of the diffusion model becomes less (e.g., resulting in a reduced number of floating-point operations per pixel, floating-point operations per second or FLOPS, or other metric), at the cost of reduced fidelity. For example, the diffusion model can be tuned with a small number of steps (e.g., 100 steps) to achieve a desired perceptual quality and fidelity at low complexity (a relatively small DDPM with a low number of sampling steps).

In some cases, the machine learning system 500 can receive input indicating a number of sampling steps to use for the diffusion model 526. For example, as shown in FIG. 5, the residual model 526 can receive a sampling step input 539 indicating a number of sampling steps to use for predicting the predicted residual 527. Based on the sampling step input 539, the diffusion model 526 can determine or modify the number of sampling steps. The sampling step input 539 can include user input, input based on system or device constraints, input based on environmental conditions, any combination thereof, and/or other input.

In some examples, the input can include user input received via a user interface that can be used to configure the machine learning system. In some cases, a user can provide input to a graphical user interface to modify a sampling schedule of the diffusion model 526 (providing a user-friendly knob to control the perception-distortion tradeoff), which can increase or decrease the number of sampling steps of the diffusion model 526 (e.g., from 250 to 100 sampling steps, from 50 to 100 sampling steps, etc.). In one illustrative example, the user input can indicate a specific number of steps, which corresponds to a specific perceptual quality-fidelity trade-off. In another illustrative example, the user input can indicate a desired perceptual quality, a desired fidelity, or a desired perceptual quality-fidelity trade-off, and based on the input, the system can determine the number of steps needed to satisfy the perceptual quality, fidelity, or perceptual quality-fidelity trade-off.

In some examples, the input can be based on system or device constraints. In one illustrative example, the constraints can include computing constraints of the device implementing the residual-based machine learning system. For instance, a device may have limited compute capability. The residual-based machine learning system may receive input from a processor or other component of the device indicating that the number of sampling steps is to be set to a particular number to reduce computational load. In another illustrative example, the constraints can include power constraints of the device implementing the residual-based machine learning system. The residual-based machine learning system may receive input from the processor or other component of the device indicating that the number of sampling steps is to be set to a particular number to the amount of power used by the residual-based machine learning system.

In some cases, the sampling can be stopped at any point that the desired tradeoff is achieved. In one illustrative example, the diffusion model can be tuned to stop sampling early (e.g., after 120 sampling steps), in which case the final reconstructed image will have high fidelity at the cost of visual quality. In another illustrative example, the diffusion model can be tuned to stop late (e.g., after 250 sampling steps), in which case the final reconstructed image will have high visual quality at the cost of some fidelity. Using such a variable sampling rate for the diffusion model 526 can allow the machine learning system 500 to smoothly traverse the rate-distortion-perception tradeoff at test time. The variable sampling also enables the codec with dynamic computing capabilities, so that performance can be tuned to user or device constraints.

In some cases, the machine learning system 500 can be trained so that the codec machine learning model 521 is trained (e.g., as described above with respect to FIG. 7) and the parameters (e.g., the weights, biases, etc.) are frozen (remain fixed) during training of the diffusion model 526, in which case the diffusion model 526 may only perform enhancement. In other cases, the entire machine learning system 500 can be trained end-to-end.

Using the residual-based machine learning systems and techniques described herein, very high perceptual quality output sample reconstructions (e.g., reconstructed images) can be generated with good fidelity and rate characteristics. The residual model-based machine learning system can provide codec that performs a lossy compression of images, including high resolution images. The residual model-based machine learning system can achieve competitive or better performance as that of GAN-based methods, and allows smooth traversal of the rate-distortion-perception tradeoff at test time, whereas GAN-based methods cannot flexibly trade off distortion for perceptual quality, as they require re-training with different adversarial factors.

Figure 11:
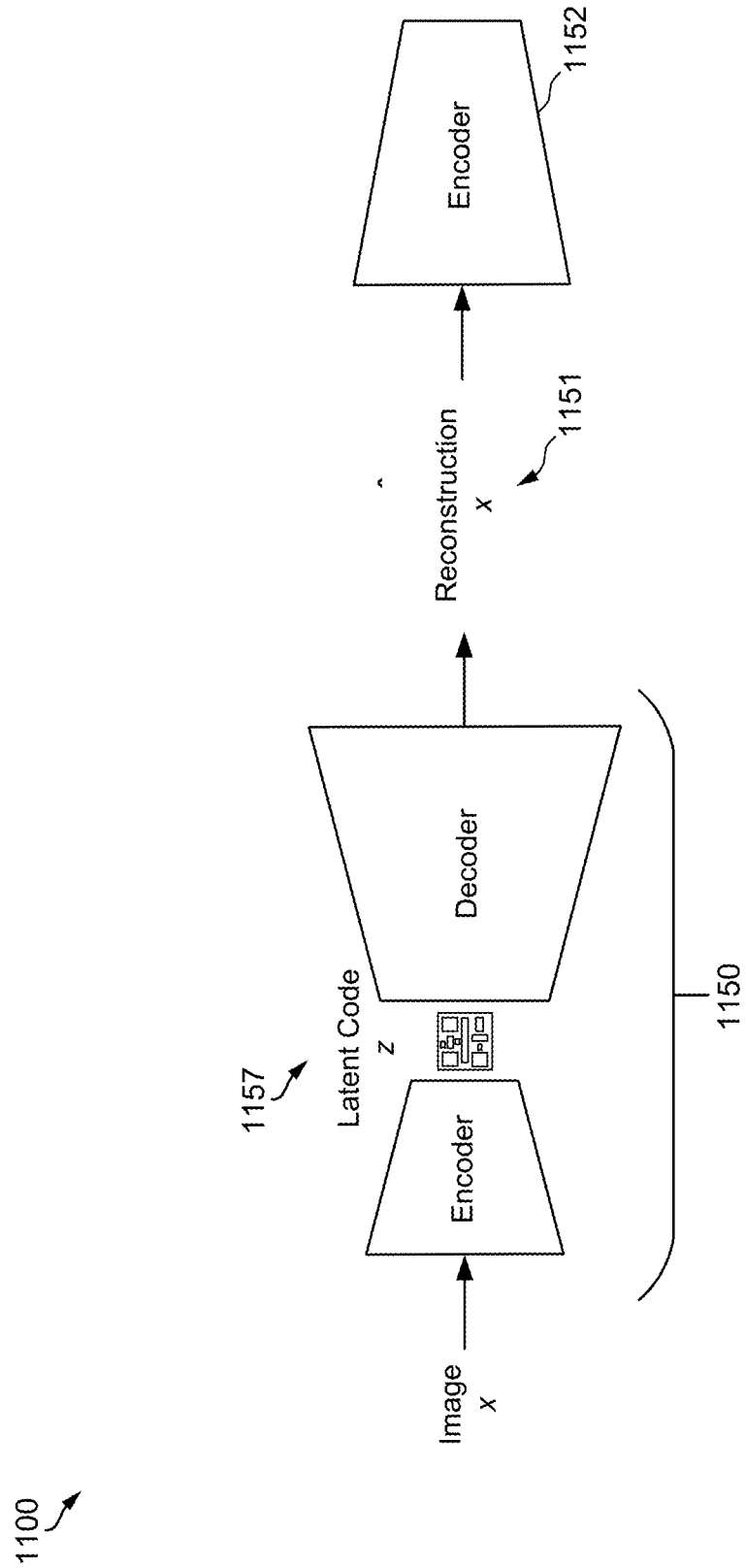
FIG. 11 is a diagram illustrating an example of a generative adversarial network (GAN) for reconstructing an image from an input image, in accordance with some examples of the present disclosure.

FIG. 11 is a diagram illustrating an example of a generative adversarial network (GAN) 1100 for reconstructing an image from an input image. The GAN 1100 is a form of generative neural network that can learn patterns in input data so that the neural network model can generate new synthetic outputs that reasonably could have been from the original dataset. A GAN can include two neural networks that operate together. One of the neural networks is referred to as a generative neural network or generator 1150 (sometimes denoted as G(z)). The generator 1150 can include an encoder 1153 and a decoder 1155. The encoder 1153 can extract features from an input image x and output a latent code 1157. The decoder 1155 can receive the latent code 1157 and can process the latent code 1157 to generate a synthesized output 1151 (e.g., a reconstructed image 2). The other neural network is referred to as a discriminative neural network or discriminator 1152 (sometimes denoted as D(X)). The discriminator 1152 evaluates the output 1151 for authenticity (whether the output is from an original dataset, such as the training dataset, or is generated by the generator).

The training input and output can include images as an illustrative example. The generator 1150 is trained to try and fool the discriminator 1152 into determining a synthesized image generated by the generator 1150 is a real image from the dataset. The training process continues and the generator 1150 becomes better at generating the synthetic images that look like real images. The discriminator 1152 continues to find flaws in the synthesized images, and the generator 1150 figures out what the discriminator 1152 is looking at to determine the flaws in the images. Once the GAN 1100 is trained, the generator 1150 is able to produce realistic looking images that the discriminator 1152 is unable to distinguish from the real images.

Unlike the GAN 1100, the residual-based machine learning systems described herein (e.g., the diffusion-based machine learning system 500 of FIG. 5) can optimize perceptual quality optimized through a discriminator/adversarial loss (e.g., distortion-perception tradeoff is fixed after training). The residual-based machine learning systems described herein can also operate in an image-space instead of residual space. GAN-based systems also use very large decoders (e.g., 120 million (M) parameters) as compared to the residual-based machine learning systems described herein (e.g., 30 M or less parameters).

The residual model-based machine learning system described herein can also dynamically navigate the rate-distortion-perception tradeoff at test time (or inference). Furthermore, while sampling from diffusion probabilistic models is expensive from a computational perspective, the cost of sampling can be drastically reduced by adapting the number of sampling steps (e.g., by modifying the sampling schedule) as described above. For instance, as described above, the variable sampling of the diffusion model 526 enables coding under multiple bitrates with the same codec (the machine learning system 500), unlike other systems (e.g., GAN-based systems and methods).

Figure 12:
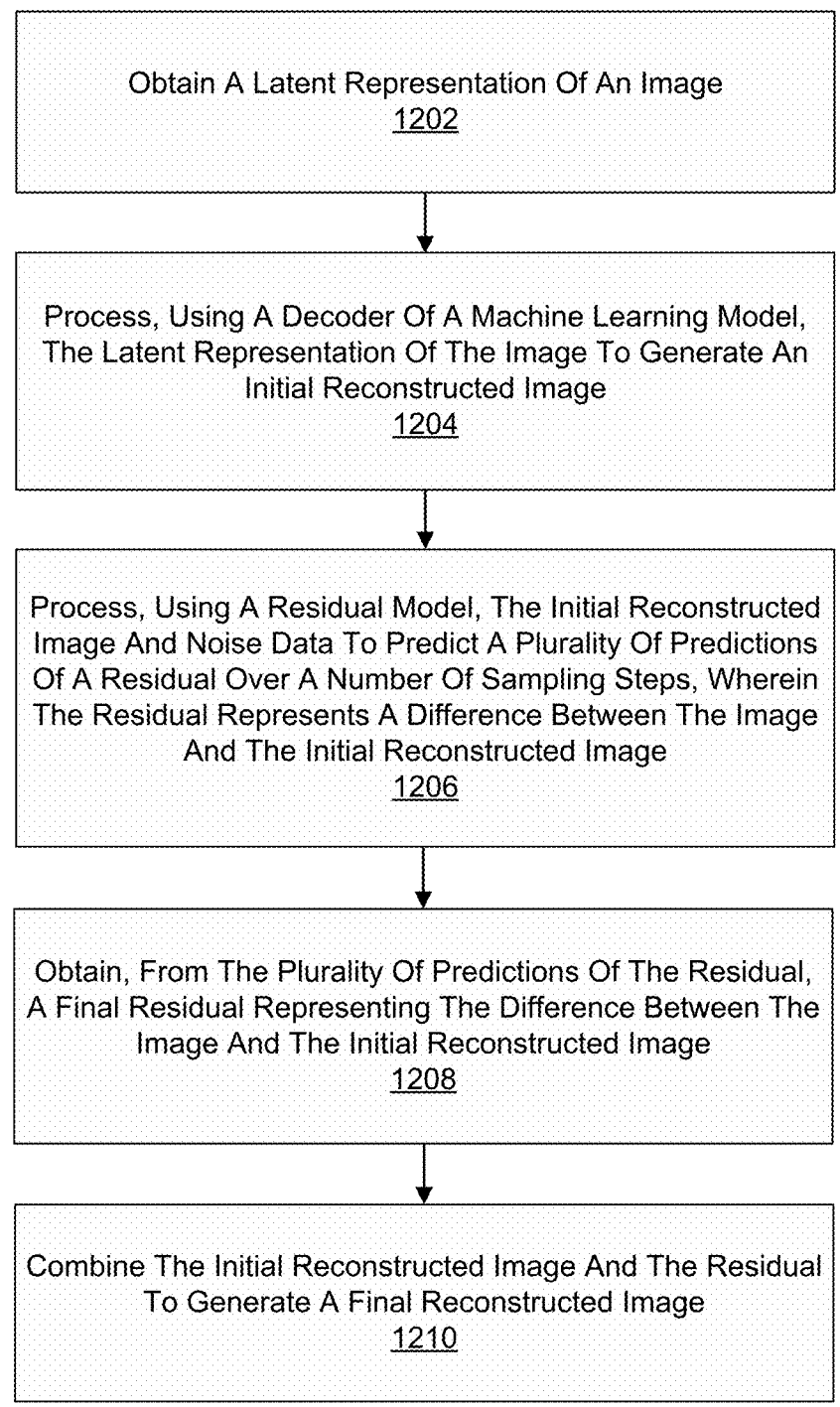
FIG. 12 is a flowchart illustrating an example of a process for processing image data using a machine learning system including a diffusion model, in accordance with some examples of the present disclosure.

FIG. 12 is a flowchart illustrating an example process 1200 for processing media data. At block 1202, the process 1200 can include obtaining a latent representation of an image. In one illustrative example, the image can include the image 520 of FIG. 5 and the latent representation of the image 520 can include the latent code 523. In some aspects, the process 1200 can include obtaining the image and processing, using an encoder of the machine learning model, the image to generate the latent representation of an image. In one illustrative example, the encoder can include the encoder 524 of FIG. 5.

At block 1204, the process 1200 can include processing, using a decoder of a machine learning model, the latent representation of the image to generate an initial reconstructed image. In one illustrative example, the decoder can include the decoder 524 of FIG. 5 and the initial reconstructed image can include the initial reconstructed image 525. In another example, the decoder can include the decoder 723 of FIG. 7.

At block 1206, the process 1200 can include processing, using a residual model, the initial reconstructed image and noise data to predict a plurality of predictions (e.g., a sequence of predictions) of a residual over a number of sampling steps. The residual represents a difference between the image and the initial reconstructed image. In one illustrative example, the residual model can include a diffusion model, such as the diffusion model 526 of FIG. 5 or the diffusion model 926 of FIG. 9. In another illustrative example, the residual model can include a recurrent neural network (RNN). In some cases, a prediction of the residual of the plurality of predictions can be determined at each sampling step of the number of sampling steps. In one example, the number of sampling steps can include the steps $r_T$, $r_{T-1}$, and $r_0$ shown in FIG. 5 and/or in FIG. 9. In another example, the number of sampling steps can include the sampling steps 0 through 100 shown in FIG. 10.

At block 1208, the process 1200 can include obtaining, from the plurality of predictions of the residual, a final residual representing the difference between the image and the initial reconstructed image. For instance, the final residual can include the residual determined at sampling step $r_0$ shown in FIG. 5 (or FIG. 9) or sampling step 100 shown in FIG. 10.

In some aspects, as described herein, the number of sampling steps is adjustable to obtain a tradeoff among rate of the latent representation, perceptual quality of the final reconstructed image, and distortion between the image and the final reconstructed image. For instance, the process 1200 can include receiving input indicating the number of sampling steps and can determine the number of sampling steps based on the input. In one example, the input includes user input received via a user interface, as described herein. In another example, the input is based on a constraint associated with a computing device (e.g., a computing device including the decoder and the residual model), such as a computing constraint of the computing device, a power constraint of the computing device, a latency constraint associated with the computing device, any combination thereof, and/or other constraint. In another example, the process 1200 can include determining the number of sampling steps based on a target perceptual quality and fidelity trade-off for the final reconstructed image (e.g., indicated by a user input, determined by the computing device, etc.).

In some cases, the residual model is conditioned on the initial reconstructed image. For instance, the process 1200 can include processing, using the residual model at a first sampling step, the initial reconstructed image and the noise data to predict a first prediction of the residual. The process 1200 can further include processing, using the residual model at a second sampling step, the initial reconstructed image and the first prediction of the residual to predict a second prediction of the residual. The process 1200 can continue generating predictions of the residual until a configured final sampling step is reached. The process 1200 can include processing, using the residual model at a third sampling step (e.g., the final sampling step, such as sampling step $r_0$ shown in FIG. 5 (or FIG. 9) or sampling step 100 shown in FIG. 10, or other sampling step), the initial reconstructed image and a prior prediction of the residual (e.g., a residual prediction determined at the sampling step immediately prior to the final sampling step, the second prediction of the residual in the example above, or other residual prediction during a sampling step) to predict the final residual.

At block 1210, the process 1200 can include combining the initial reconstructed image and the residual to generate a final reconstructed image. In one illustrative example, the final reconstructed image can include the final reconstructed image 529 of FIG. 5 and/or FIG. 9.

In some cases, the residual model is further conditioned on an auxiliary latent representation of the image. For instance, the process 1200 can include obtaining an auxiliary latent representation of the image. In one illustrative example, the auxiliary representation can include the auxiliary latent code 930 of FIG. 9. The process 1200 can further include processing, using the residual model, the initial reconstructed image, the noise data, and the auxiliary latent representation of the image to predict the plurality of predictions of the residual.

In some examples, the processes described herein (e.g., process 1200 and/or other process described herein) may be performed by a computing device or apparatus. In one example, the process 1200 can be performed by the computing system 1300 shown in FIG. 13.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1100, the process 1200, the process 1300, the process 1400, the process 1500, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1200 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1200 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
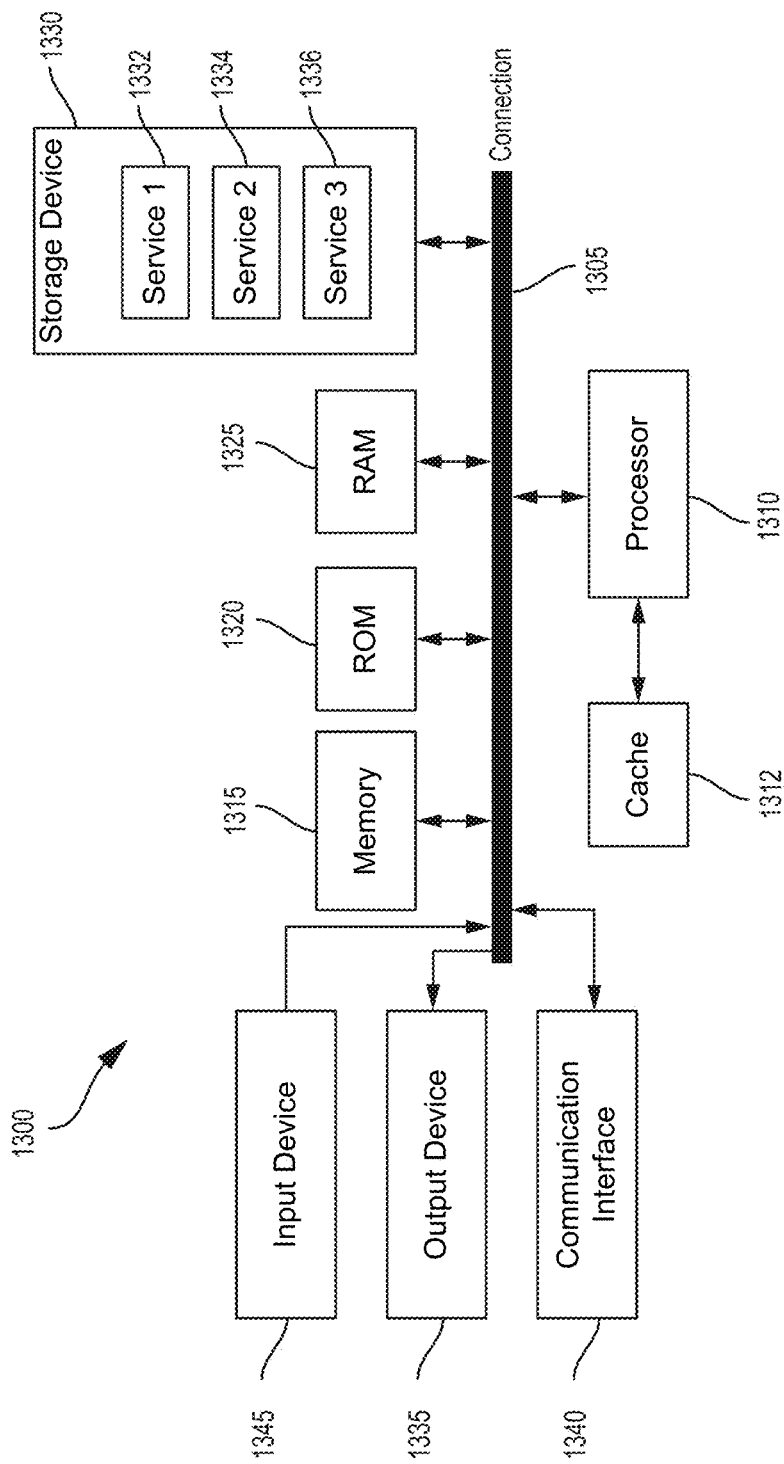
FIG. 13 illustrates an example computing system, in accordance with some examples of the present disclosure.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300. Computing system 1300 can include communications interface 1340, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memory storage, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more"

of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. A method of processing image data, comprising: obtaining a latent representation of an image; processing, using a decoder of a machine learning model, the latent representation of the image to generate an initial reconstructed image; processing, using a residual model, the initial reconstructed image and noise data to predict a plurality of predictions of a residual over a number of sampling steps, wherein the residual represents a difference between the image and the initial reconstructed image;

obtaining, from the plurality of predictions of the residual, a final residual representing the difference between the image and the initial reconstructed image; and combining the initial reconstructed image and the residual to generate a final reconstructed image.

Aspect 2. The method of Aspect 1, wherein the number of sampling steps is adjustable to obtain a tradeoff among rate of the latent representation, perceptual quality of the final reconstructed image, and distortion between the image and the final reconstructed image.

Aspect 3. The method of any one of Aspects 1 or 2, further comprising: determining the number of sampling steps.

Aspect 4. The method of Aspect 3, further comprising: determining the number of sampling steps based on a setting.

Aspect 5. The method of Aspect 3, further comprising: configuring the setting based on an input.

Aspect 6. The method of Aspect 5, further comprising: receiving the input.

Aspect 7. The method of any one of Aspects 5 or 6, wherein the input includes user input received via a user interface.

Aspect 8. The method of any one of Aspects 5 to 7, wherein the input is based on a constraint associated with a computing device, the constraint including at least one of a computing constraint of the computing device, a power constraint of the computing device, or a latency constraint associated with the computing device.

Aspect 9. The method of any one of Aspects 1 to 8, further comprising: determining the number of sampling steps based on a target perceptual quality and fidelity trade-off for the final reconstructed image.

Aspect 10. The method of any one of Aspects 1 to 9, wherein the residual model is conditioned on the initial reconstructed image.

Aspect 11. The method of Aspects 10, wherein the residual model is further conditioned on an auxiliary latent representation of the image.

Aspect 12. The method of any one of Aspects 1 to 11, further comprising: processing, using the residual model at a first sampling step, the initial reconstructed image and the noise data to predict a first prediction of the residual; and processing, using the residual model at a second sampling step, the initial reconstructed image and the first prediction of the residual to predict a second prediction of the residual.

Aspect 13. The method of Aspect 12, further comprising: processing, using the residual model at a third sampling step, the initial reconstructed image and a prior prediction of the residual to predict the final residual.

Aspect 14. The apparatus of Aspect 13, wherein the prior prediction of the residual is the second prediction of the residual, or wherein the third sampling step is a final sampling step and the prior prediction of the residual is a residual prediction determined at a sampling step immediately prior to the final sampling step.

Aspect 15. The method of any one of Aspects 1 to 14, further comprising: obtaining the image; and processing, using an encoder of the machine learning model, the image to generate the latent representation of an image.

Aspect 16. The method of any one of Aspects 1 to 15, further comprising: obtaining an auxiliary latent representation of the image; and processing, using the residual model, the initial reconstructed image, the noise data, and the auxiliary latent representation of the image to predict the plurality of predictions of the residual.

Aspect 17. The method of any one of Aspects 1 to 16, wherein the residual model includes one of a diffusion model or a recurrent neural network (RNN).

Aspect 18. The method of any one of Aspects 1 to 17, wherein the plurality of predictions includes a sequence of predictions.

Aspect 19. An apparatus for processing image data, comprising: at least one memory; and at least one processor coupled to the at least one memory and configured to: obtain a latent representation of an image; process, using a decoder of a machine learning model, the latent representation of the image to generate an initial reconstructed image; process, using a residual model, the initial reconstructed image and noise data to predict a plurality of predictions of a residual over a number of sampling steps, wherein the residual represents a difference between the image and the initial reconstructed image; obtain, from the plurality of predictions of the residual, a final residual representing the difference between the image and the initial reconstructed image; and combine the initial reconstructed image and the residual to generate a final reconstructed image.

Aspect 20. The apparatus of Aspect 19, wherein the number of sampling steps is adjustable to obtain a tradeoff among rate of the latent representation, perceptual quality of the final reconstructed image, and distortion between the image and the final reconstructed image.

Aspect 21. The apparatus of any one of Aspects 19 or 20, wherein the at least one processor is configured to: determine the number of sampling steps.

Aspect 22. The apparatus of Aspect 21, wherein the at least one processor is configured to: determine the number of sampling steps based on a setting.

Aspect 23. The apparatus of Aspect 22, wherein the at least one processor is configured to: configure the setting based on an input.

Aspect 24. The apparatus of Aspect 23, wherein the at least one processor is configured to: receive the input.

Aspect 25. The apparatus of any one of Aspects 23 or 24, wherein the input includes user input received via a user interface.

Aspect 26. The apparatus of any one of Aspects 23 to 25, wherein the input is based on a constraint associated with a computing device, the constraint including at least one of a computing constraint of the computing device, a power constraint of the computing device, or a latency constraint associated with the computing device.

Aspect 27. The apparatus of any one of Aspects 19 to 26, wherein the at least one processor is configured to: determine the number of sampling steps based on a target perceptual quality and fidelity trade-off for the final reconstructed image.

Aspect 28. The apparatus of any one of Aspects 19 to 27, wherein the residual model is conditioned on the initial reconstructed image.

Aspect 29. The apparatus of Aspects 28, wherein the residual model is further conditioned on an auxiliary latent representation of the image.

Aspect 30. The apparatus of any one of Aspects 19 to 29, wherein the at least one processor is configured to: process, using the residual model at a first sampling step, the initial reconstructed image and the noise data to predict a first prediction of the residual; and process, using the residual model at a second sampling step, the initial reconstructed image and the first prediction of the residual to predict a second prediction of the residual.

Aspect 31. The apparatus of Aspect 30, wherein the at least one processor is configured to: process, using the residual model at a third sampling step, the initial reconstructed image and a prior prediction of the residual to predict the final residual.

Aspect 32. The apparatus of Aspect 13, wherein the prior prediction of the residual is the second prediction of the residual, or wherein the third sampling step is a final sampling step and the prior prediction of the residual is a residual prediction determined at a sampling step immediately prior to the final sampling step.

Aspect 33. The apparatus of any one of Aspects 19 to 32, wherein the at least one processor is configured to: obtain the image; and process, using an encoder of the machine learning model, the image to generate the latent representation of an image.

Aspect 34. The apparatus of any one of Aspects 19 to 33, wherein the at least one processor is configured to: obtain an auxiliary latent representation of the image; and process, using the residual model, the initial reconstructed image, the noise data, and the auxiliary latent representation of the image to predict the plurality of predictions of the residual.

Aspect 35. The apparatus of any one of Aspects 19 to 34, wherein the residual model includes one of a diffusion model or a recurrent neural network (RNN).

Aspect 36. The apparatus of any one of Aspects 19 to 35, wherein the plurality of predictions includes a sequence of predictions.

Aspect 37. A non-transitory computer-readable medium having stored thereon instructions that, when executed by one or more processors, cause the one or more processors to perform operations according to any of Aspects 1 to 18.

Aspect 38. An apparatus for processing image data, the apparatus including one or more means for performing operations according to any of Aspects 1 to 18.

What is claimed is:

1. An apparatus for processing image data, comprising:
   at least one memory; and
   at least one processor coupled to the at least one memory and configured to:
      obtain a latent representation of an image;
      process, using a decoder of a machine learning model, the latent representation of the image to generate an initial reconstructed image;
      process, using a residual model, the initial reconstructed image and noise data to predict a plurality of predictions of a residual over a number of sampling steps, wherein the residual represents a difference between the image and the initial reconstructed image;
      obtain, from the plurality of predictions of the residual, a final residual representing the difference between the image and the initial reconstructed image; and
      combine the initial reconstructed image and the final residual to generate a final reconstructed image.

2. The apparatus of claim 1, wherein the number of sampling steps is adjustable to obtain a tradeoff among rate of the latent representation, perceptual quality of the final reconstructed image, and distortion between the image and the final reconstructed image.

3. The apparatus of claim 1, wherein the at least one processor is configured to:
   determine the number of sampling steps.

4. The apparatus of claim 3, wherein the at least one processor is configured to:
   determine the number of sampling steps based on a setting.

5. The apparatus of claim 4, wherein the at least one processor is configured to:
   configure the setting based on an input.

6. The apparatus of claim 5, wherein the at least one processor is configured to:
   receive the input.

7. The apparatus of claim 5, wherein the input includes user input received via a user interface.

8. The apparatus of claim 5, wherein the input is based on a constraint associated with a computing device, the constraint including at least one of a computing constraint of the computing device, a power constraint of the computing device, or a latency constraint associated with the computing device.

9. The apparatus of claim 1, wherein the at least one processor is configured to:
   determine the number of sampling steps based on a target perceptual quality and fidelity trade-off for the final reconstructed image.

10. The apparatus of claim 1, wherein the residual model is conditioned on the initial reconstructed image.

11. The apparatus of claim 10, wherein the residual model is further conditioned on an auxiliary latent representation of the image.

12. The apparatus of claim 1, wherein the at least one processor is configured to:
   process, using the residual model at a first sampling step, the initial reconstructed image and the noise data to predict a first prediction of the residual; and
   process, using the residual model at a second sampling step, the initial reconstructed image and the first prediction of the residual to predict a second prediction of the residual.

13. The apparatus of claim 12, wherein the at least one processor is configured to:
   process, using the residual model at a third sampling step, the initial reconstructed image and a prior prediction of the residual to predict the final residual.

14. The apparatus of claim 13, wherein the prior prediction of the residual is the second prediction of the residual.

15. The apparatus of claim 13, wherein the third sampling step is a final sampling step, and wherein the prior prediction of the residual is a residual prediction determined at a sampling step immediately prior to the final sampling step.

16. The apparatus of claim 1, wherein the at least one processor is configured to:
   obtain the image; and
   process, using an encoder of the machine learning model, the image to generate the latent representation of an image.

17. The apparatus of claim 1, wherein the at least one processor is configured to:
   obtain an auxiliary latent representation of the image; and
   process, using the residual model, the initial reconstructed image, the noise data, and the auxiliary latent representation of the image to predict the plurality of predictions of the residual.

18. The apparatus of claim 1, wherein the residual model includes one of a diffusion model or a recurrent neural network (RNN).

19. The apparatus of claim 1, wherein the plurality of predictions includes a sequence of predictions.

20. A method of processing image data, comprising:
   obtaining a latent representation of an image;
   processing, using a decoder of a machine learning model, the latent representation of the image to generate an initial reconstructed image;

processing, using a residual model, the initial reconstructed image and noise data to predict a plurality of predictions of a residual over a number of sampling steps, wherein the residual represents a difference between the image and the initial reconstructed image;

obtaining, from the plurality of predictions of the residual, a final residual representing the difference between the image and the initial reconstructed image; and combining the initial reconstructed image and the final residual to generate a final reconstructed image.

21. The method of claim 20, wherein the number of sampling steps is adjustable to obtain a tradeoff among rate of the latent representation, perceptual quality of the final reconstructed image, and distortion between the image and the final reconstructed image.

22. The method of claim 20, further comprising:

configuring a setting based on an input, wherein the input is based on a constraint associated with a computing device, the constraint including at least one of a computing constraint of the computing device, a power constraint of the computing device, or a latency constraint associated with the computing device; and determining the number of sampling steps based on the setting.

23. The method of claim 20, further comprising:

determining the number of sampling steps based on a target perceptual quality and fidelity trade-off for the final reconstructed image.

24. The method of claim 20, wherein the residual model is conditioned on the initial reconstructed image.

25. The method of claim 24, wherein the residual model is further conditioned on an auxiliary latent representation of the image.

26. The method of claim 20, further comprising:

processing, using the residual model at a first sampling step, the initial reconstructed image and the noise data to predict a first prediction of the residual; and processing, using the residual model at a second sampling step, the initial reconstructed image and the first prediction of the residual to predict a second prediction of the residual.

27. The method of claim 26, further comprising:

processing, using the residual model at a third sampling step, the initial reconstructed image and a prior prediction of the residual to predict the final residual.

28. The method of claim 20, further comprising:

obtaining the image; and processing, using an encoder of the machine learning model, the image to generate the latent representation of an image.

29. The method of claim 20, further comprising:

obtaining an auxiliary latent representation of the image; and processing, using the residual model, the initial reconstructed image, the noise data, and the auxiliary latent representation of the image to predict the plurality of predictions of the residual.

30. The method of claim 20, wherein the residual model includes one of a diffusion model or a recurrent neural network (RNN).

* * * * *